(12) United States Patent
Fokkema et al.

(10) Patent No.: US 6,747,913 B2
(45) Date of Patent: Jun. 8, 2004

(54) METHOD AND SYSTEM FOR DEGHOSTING

(75) Inventors: Jacob T. Fokkema, Schiedam (NL); Peter M. van den Berg, Pijnacker (NL)

(73) Assignee: PGS Americas, Inc., Houston, TX (US)

( * ) Notice: Subject to any disclaimer, the term of this patent is extended or adjusted under 35 U.S.C. 154(b) by 102 days.

(21) Appl. No.: 10/256,768

(22) Filed: Sep. 27, 2002

(65) Prior Publication Data

US 2003/0125880 A1 Jul. 3, 2003

Related U.S. Application Data

(62) Division of application No. 09/728,266, filed on Dec. 1, 2000, now Pat. No. 6,477,470.

(51) Int. Cl.[7] .............................. G01V 1/38; G01V 1/28

(52) U.S. Cl. .............................. 367/24; 367/15; 367/19; 702/14

(58) Field of Search .............................. 367/15, 19, 20, 367/24; 702/14

(56) References Cited

U.S. PATENT DOCUMENTS

| | | | | |
|---|---|---|---|---|
| 4,555,779 A | * | 11/1985 | Roberts | 367/19 |
| 4,635,236 A | * | 1/1987 | Roberts | 367/19 |
| 4,669,067 A | * | 5/1987 | Roberts | 367/19 |
| 4,992,990 A | * | 2/1991 | Langeland et al. | 367/19 |
| 4,992,991 A | * | 2/1991 | Young et al. | 367/20 |
| 5,193,077 A | | 3/1993 | Weiglein et al. | |
| 5,497,356 A | * | 3/1996 | Norton et al. | 367/96 |
| 5,550,935 A | | 8/1996 | Erdem et al. | |
| 5,910,728 A | | 6/1999 | Sodickson | |
| 6,477,420 B1 | * | 11/2002 | Struble et al. | 702/17 |

OTHER PUBLICATIONS

Some Synthetic Deghosting Tests for Limited Data in The Cross–Line Direction (2D Version), Jacob T. Fokkema and Peter M. van den Berg, May 15, 1999, pp. 3–20.

Some Synthetic Deghosting Tests for Limited Data in The Cross–Line Direction (2D Version), Jacob T. Fokkema and Peter M. van den Berg, Feb. 19, 1999, pp. 3–28.

Angular Spectrum of Streamer Data in the Cross–Line Direction, Jacob T. Fokkema and Peter M. van den Berg, Mar. 25, 1998, pp. 3–8.

Discrete Angular Spectrum of Streamer Data in the Cross–Line Direction, Jacob T. Fokkema and Peter M. van den Berg, Aug. 31, 1998, pp. 5, 7, 9.

Deghosting Procedures for Marine Data Measured by Deep Streamers, Jacob T. Fokkema and Peter M. van den Berg, Dec. 30, 1997, pp. 5, 7, 9, 17, 19.

Deghosting Procedures for Marine Data Measured by Deep Streamers (2D Version), Jacob T. Fokkema and Peter M. van den Berg, Nov. 23, 1998, pp. 3, 5, 7, 9, 11, 13, 15, 17.

A Conjugate Gradient Reconstruction of Missing offsets, Roald G. van Borselen, Amoco Production Company, Peter M. van den Berg and Jacob T. Fokkema, Centre for Technical Geoscience, Delft University of Technology, The Netherlands, pp. 1471–1474.

(List continued on next page.)

Primary Examiner—Nelson Moskowitz
(74) Attorney, Agent, or Firm—E. Eugene Thigpen

(57) ABSTRACT

In one embodiment the invention comprises a method for receiving an acoustic wavefield beneath the surface of the water in which at least a portion of an acoustic wavefield is received at a first position, at least a portion of an acoustic wavefield is received at a second position, and at least a portion of an acoustic wavefield is received at a third position. The first position, the second position and the third position are triangularly positioned relative to one another. The first position is not directly above or below the second position or the third position, and the second position is not directly above or below the third position.

8 Claims, 14 Drawing Sheets

OTHER PUBLICATIONS

A New Method to Convert Unleveled Marine Seismic Data to Leveled Split–Spread Data, Leon N. Barens, Roald van Borslen, Jacob T. Fokkema, and Peter M. van den Berg, Delft University of Technology, The Netherlands, pp. 1393–1396.

Derivation of the Radon Domain Multiple Removal Algorithm, Jan W. Schoolmeesters, Jacob T. Fokkema, Peter M. van den Berg, Oct. 23, 1997, pp. 1–27.

* cited by examiner

METHOD AND SYSTEM FOR DEGHOSTING

This is a division of application Ser. No. 09/728,266 filed Dec. 1, 2000 now U.S. Pat. No. 6,477,470

BACKGROUND OF THE INVENTION

Currently in the art of geophysical marine seismic prospecting, a vessel tows very long streamers which have many seismic receivers attached. Often these streamers are miles long. These receivers receive a portion of a scattered acoustic wavefield originated from the sounding of a seismic source. The acoustic wavefield generated by the seismic source is scattered by reflections and refractions in the earth. Because these streamers are very long, have many receivers, and are towed behind a moving vessel, the coverage in the sail—or in-line direction—is very large. However, only a few streamers can be towed behind the vessel at any one time. Therefore, there is relatively very little coverage of the streamers in the cross-line direction. While there are various conventional methods to increase the number of streamers a vessel can tow in the cross-line direction, this coverage is still much less than in the in-line direction.

Because this coverage is very small, very little cross-line processing has been developed. Instead, development has concentrated on in-line processing. Furthermore, conventional in-line processing simply is not suitable for cross-line data. Currently, various passes with the vessel are made. During each of these passes, limited cross-line information is gathered. The processors then recreate the information in the cross-line direction by patching the data together. This is both inaccurate and expensive.

Furthermore, because this data must be then processed onshore much later, conventional methods have not been able to determine the quality of the in-line or cross-line data received while the vessel is still near the acquisition site. This results in a wasted opportunity to accurately collect data.

Turning now to streamer configurations, further conventional methods teach using various levels of streamers towed at different depths—usually two. These conventional methods teach to tow these cables directly above one another. This is difficult to do. Ocean currents tend to thrust the miles and miles of cables. Despite this fact, conventional methods continue to design processing algorithms for streamers towed directly above one another.

As a result, there is a long felt need for a method and system for deghosting seismic data in both the in-line direction and the cross-line direction, an improved quality control method for data acquisition, and an improved streamer configuration for vertically separated cables.

SUMMARY OF THE INVENTION

In one embodiment of the present invention, a method for processing a scattered acoustic wavefield is provided. The scattered acoustic wavefield (230) is received by at least two receivers (201). These receivers (201) are offset (250) and located at approximately the same depth (205). The method comprises transforming (101) the scattered acoustic wavefield (230) to the frequency domain (101). The method also comprises transforming (105) the scattered acoustic wavefield (230) from the frequency domain to the spectral domain. The method also comprises deghosting (110) the scattered acoustic wavefield (230) in the spectral domain. The method further comprises transforming (115) the substantially deghosted transformed acoustic wavefield to the space-time domain.

In an even further embodiment of the present invention, a method for processing a scattered acoustic wavefield (230) received by at least a first set (501) of two receivers (201) and at least a second set (502) of two receivers (201) is provided. The first set (501) of two receivers (201) is offset (250) at substantially a first depth (515) which is vertically offset (520) from at least a second set (502) of two receivers (201) offset (250) at substantially a second depth (505). The method comprises transforming (401) the scattered acoustic wavefield (230) received at the first depth (515) to the frequency domain. The method further comprises transforming (405) the scattered acoustic wavefield (230) received at the second depth (505) to the frequency domain (405). The method further comprises transforming (410) the scattered acoustic wavefield (230) received at the first depth (515) from the frequency domain to the spectral domain. The method further comprises transforming (415) the scattered acoustic wavefield (230) received at the second depth (505) from the frequency domain to the spectral domain. The method also comprises generating (420) a substantially deghosted scattered acoustic wavefield in the spectral domain. The method further comprises transforming (425) the substantially deghosted scattered acoustic wavefield to the space-time domain.

In an even further embodiment, a method for receiving an acoustic wavefield beneath the surface of the water is also provided. In one embodiment, the method comprises receiving at least a portion of an acoustic wavefield (230) at a first position (701). The method also comprises receiving at least a portion of an acoustic wavefield (230) at a second position (702) and receiving at least a portion of an acoustic wavefield (230) at a third position (703). The first position (701), the second position (702), and the third position (703) are triangularly positioned (720) relative to one another.

In another embodiment of the present invention, a method of controlling the quality of seismic data acquisition substantially near the acquisition site is provided. The method comprises generating (901) a scattered acoustic wavefield (230). The method further comprises receiving (905) at least a portion of the scattered acoustic wavefield (230). The method further comprises substantially deghosting (910) the scattered acoustic wavefield (230) relatively near the acquisition site. The method further comprises evaluating (915) the quality of the substantially deghosted scattered acoustic wavefield.

In a further embodiment, a system for processing a scattered acoustic wavefield (230) received by at least two receivers (201) offset (250) at substantially the same depth (205) is provided. The system comprises means for transforming (1101) the scattered acoustic wavefield (230) to the frequency domain. The system further comprises means for transforming (1101) the scattered acoustic wavefield (230) from the frequency domain to the spectral domain. The system further comprises means for deghosting (1115) the scattered acoustic wavefield in the spectral domain. The system further comprises means for transforming (1120) the substantially deghosted transformed acoustic wavefield (230) to the space-time domain.

In an even further embodiment, the system comprises a means for transforming (1201) the scattered acoustic wavefield (230) received at the first depth (515) to the frequency domain. The system further comprises means for transforming (1205) the scattered acoustic wavefield (230) received at the second depth (505) to the frequency domain. The system further comprises means for transforming (1210) the scattered acoustic wavefield (230) received at the first depth (515) from the frequency domain to the spectral domain.

The system further comprises a means for transforming (1215) the scattered acoustic wavefield (230) received at the second depth (505) from the frequency domain to the spectral domain. The system further comprises means for generating (1220) a substantially deghosted scattered acoustic wavefield in the spectral domain. The system further comprises means for transforming (1225) the substantially deghosted scattered acoustic wavefield to the space-time domain.

In still another embodiment of the present invention, a system for receiving an acoustic wavefield beneath the surface of the water is provided. The system comprises means for receiving at least a portion of an acoustic wavefield at a first position (1305). The system further comprises means for receiving at least a portion of an acoustic wavefield at a second position (1310). The system further comprises means for receiving at least a portion of an acoustic wavefield at a third position (1315). In an even further embodiment, the first position (1315), the second position (1310), and the third position (1315) are triangularly positioned relative to one another.

In a further embodiment, a system of controlling the quality of seismic data acquisition substantially near the acquisition site is provided. The system comprises a means for generating (1401) a scattered acoustic wavefield (230). The system further comprises a means for receiving (1405) at least a portion of the scattered acoustic wavefield (230). The system further comprises a means for substantially deghosting (1410) the scattered acoustic wavefield (230) relatively near the acquisition site. The system further comprises a means for evaluating (1415) the quality of the substantially deghosted scattered acoustic wavefield.

In an even further embodiment, an apparatus for processing a scattered acoustic wavefield (230) received by at least two receivers (201) is provided. The receivers (201) are offset (250) and located at approximately the same depth (205). The apparatus comprises a frequency domain transformer (1501). The apparatus further comprises a spectral domain transformer (1505). The apparatus further comprises a deghoster (1510). The apparatus further comprise a space-time domain transformer (1515).

In an even further embodiment, an apparatus for processing a scattered acoustic wavefield (230) received by at least a first set (501) of two receivers (201) and a second set (502) of two receivers (201) is provided. The first set (501) of two receivers (201) is offset (250) at substantially a first depth (515) which is vertically offset (520) from at least a second set (502) of two receivers (201) offset (250) at substantially a second depth (505). The apparatus comprises a first depth frequency domain transformer (1601). The apparatus also comprises a second depth (505) frequency domain transformer (1605). The apparatus further comprises a first depth (515) spectral domain transformer (1610). The apparatus further comprises a second depth (505) spectral domain transformer (1615). The apparatus also comprises a space-time domain transformer (1625).

In an even further embodiment of the present invention, a streamer configuration is provided. The streamer configuration comprises a first seismic streamer (710), a second seismic streamer (740) and a third seismic streamer (730). In this configuration the first seismic streamer (710), the second seismic streamer (740), and the third seismic streamer (730) are essentially triangularly positioned relative to one another. Furthermore, the first streamer (710) is not directly above or below the second (740) or third (730) streamer. The second streamer (740) is not directly above or below the third streamer (730).

In an even further embodiment, an apparatus of controlling the quality of seismic data acquisition at the acquisition site is provided. The apparatus comprises a scattered acoustic wavefield (230) generator (1701). The apparatus further comprises a scattered acoustic wavefield (230) receiver (1705). The apparatus further comprises a deghoster (1710). The apparatus also comprises a quality evaluator (1715).

DETAILED DESCRIPTION OF EXAMPLE EMBODIMENTS OF THE PRESENT INVENTION

Figure 1:
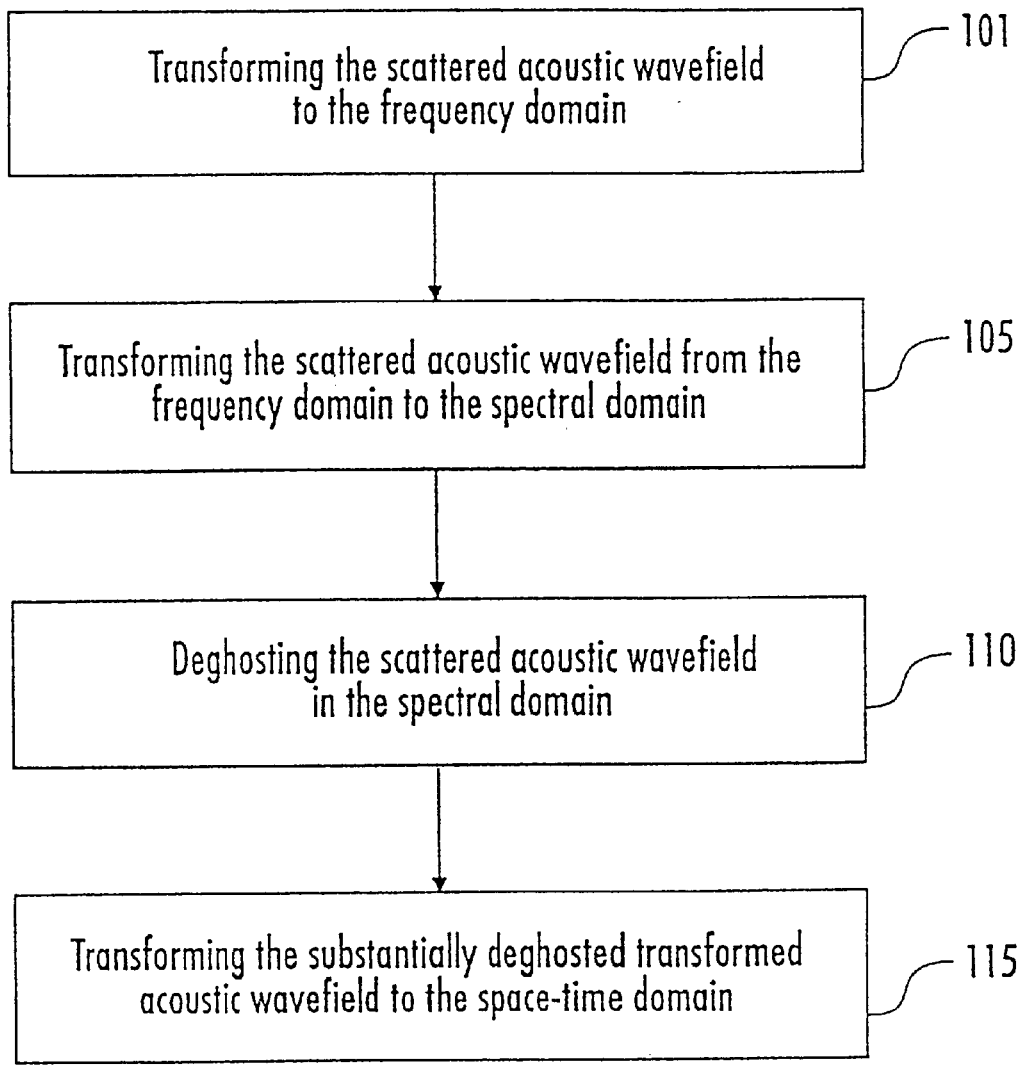
FIG. 1 is a block diagram of an example embodiment of a method of the present invention.
Figure 2:
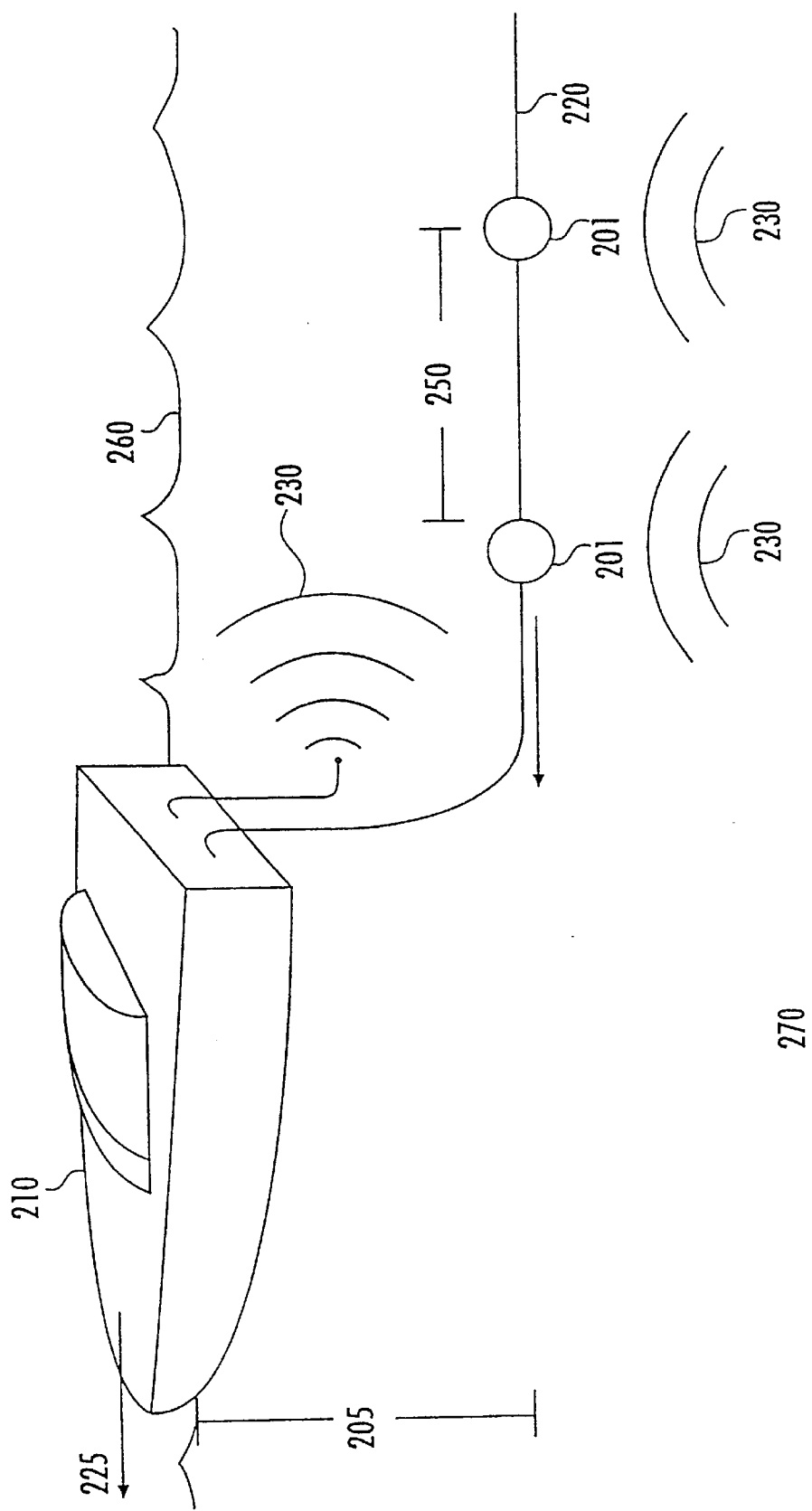
FIG. 2 is a diagram of various aspects of example embodiments of the present invention in the marine environment.
Figure 3:
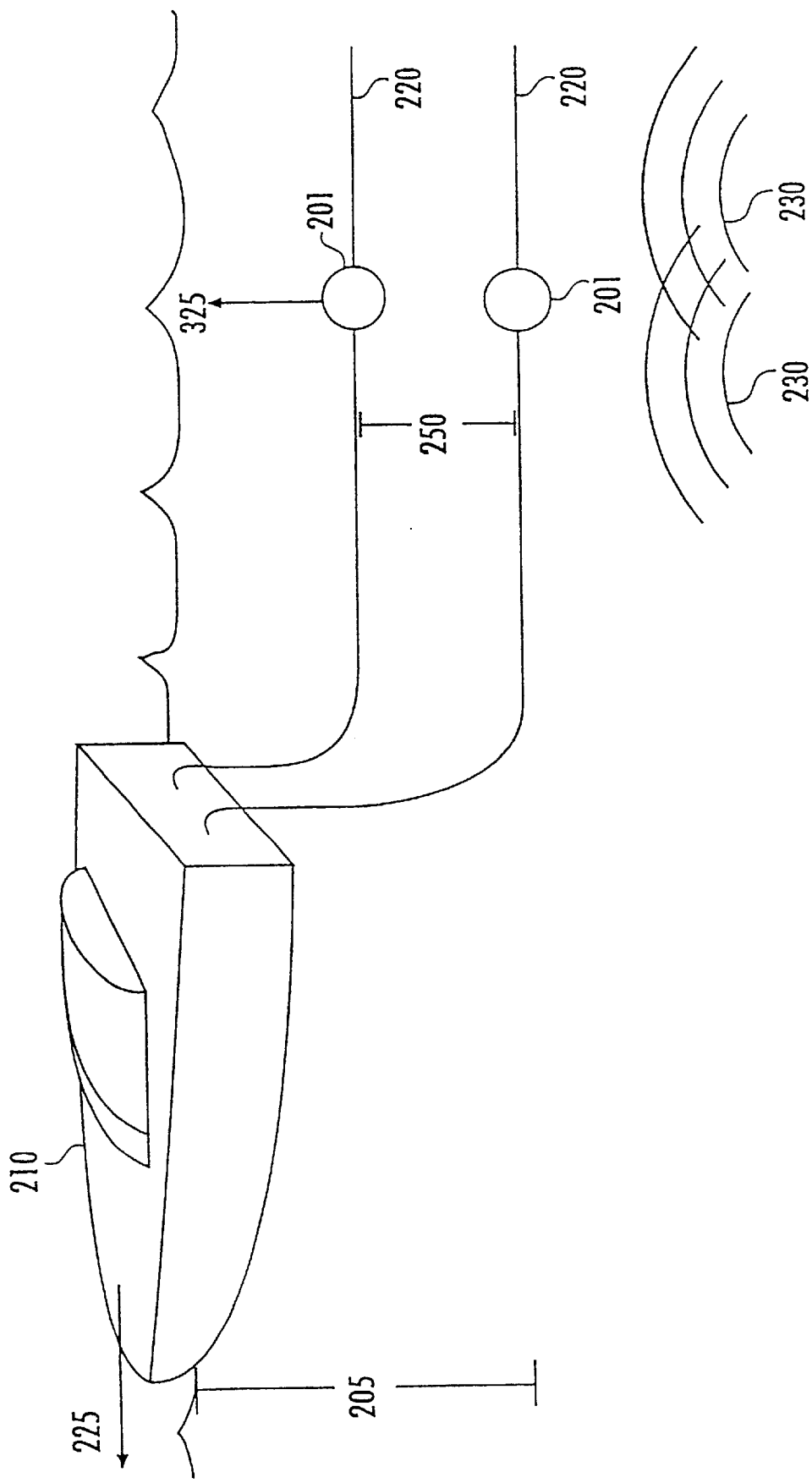
FIG. 3 is a diagram of various aspects of example embodiments of the present invention in the marine environment.

In one embodiment of the present invention, a method for processing a scattered acoustic wavefield is provided. As illustrated in FIGS. 1, 2, and 3 in this embodiment, the scattered acoustic wavefield (230) is received by at least two receivers (201). These receivers (201) are offset (250) and located approximately at the same depth (205) as illustrated in FIGS. 2 and 3. Turning to FIG. 1, the method comprises transforming (101) the scattered acoustic wavefield (230) to the frequency domain. The method also comprises transforming (105) the scattered acoustic wavefield (230) from the frequency domain to the spectral domain. The method further comprises deghosting (110) the scattered acoustic wavefield (230) in the spectral domain and transforming (115) the substantially deghosted transformed acoustic wavefield to the space-time domain.

In a further embodiment of the present invention, illustrated in FIG. 2, the two receivers (201) are offset (250) in substantially the in-line direction (225). The in-line (225) or sail direction, as it is often called, represents the direction of travel of the seismic vessel (210). As will occur to those skilled in the art, the direction of travel (225) or in-line direction, is also the direction that the receivers (201) are being towed. Therefore, in these embodiments, the offset (250) is parallel with the direction of travel (225) of the seismic vessel (210). Furthermore, in many embodiments, many receivers (201) are positioned on the seismic streamer (220) and pulled by the seismic vessel (210). As illustrated in FIG. 2, in another embodiment, the two receivers (201) are substantially at the same depth (205). In some embodiments, at least a portion of a scattered acoustic wavefield (230) is received at each of the receivers (201). As will occur to those skilled in the art, the scattered acoustic wavefield (230) is generated by various methods that will occur to those of ordinary still in the art. Such methods include, for example, using air guns, dynamite, and marine vibrators. This generated acoustic wavefield is refracted and reflected by various conditions and layers of earth, water, and other materials. Only a portion of the entire scattered acoustic wavefield (230) is received at any given receiver (201). Thus, those of ordinary skill in the art will appreciate that any reference to a received scattered acoustic wavefield (230) is referring to at least a portion of a scattered acoustic wavefield (230) generated. The portion of the scattered acoustic wavefield (230) which is actually received is dependent upon various conditions of the environment and equipment used, as will occur to those of ordinary skill in the art.

In an even further embodiment, illustrated in FIG. 3, the two receivers (201) are offset (250) in the cross-line direction (325). The cross-line direction (325) is substantially perpendicular to the direction of travel (225) of the seismic vessel (210). As will occur to one of ordinary skill in the art, conventional towing methods tow numerous receivers (201) on a plurality of streamers (220). Therefore, there is greater coverage in the in-line direction (225) than in the cross-line direction.

In an even further embodiment of the present invention, transforming (101) the scattered acoustic wavefield (230) to the frequency domain further comprises using a Fourier transform. In another embodiment, the Fourier transform is dependent upon the number of receivers (201) receiving the scattered acoustic wavefield (230). In an even further embodiment, this Fourier transform further comprises:

$$p^{sct}(x_{1,q}^R, x_{2,r}^R, x_3^R | X^S, s)$$

wherein:

$$s = j\omega = j2\pi f$$

$p^{sct}$ comprises the scattered acoustic wavefield in the frequency domain.
$x_{1,q}^R$ comprises the in-line receiver coordinate.
$x_{2,r}^R$ comprises the cross-line receiver coordinate.
$x_3^R$ comprises the receiver depth coordinate.
$X^S = (x_1^S, x_2^S, x_3^S)$ comprises the shot position.
s comprises the complex Laplace transform parameter.
$j\omega$ comprises the Fourier transform parameter.
j comprises the imaginary unit.
f comprises the real frequency.

Of course, in various embodiments, many Fourier transforms such as Fast Fourier Transforms (FFT), Discrete Fourier Transforms (DFT), and discrete versions of the Laplace Transforms will occur to those of ordinary skill in the art. Transforming the scattered acoustic wavefield to the frequency domain provides many benefits. For example, differentiation with respect to time becomes a simple multiplication in the frequency domain, and a time convolution becomes a simple product in the frequency domain.

In a further embodiment, the transforming (105) the scattered acoustic wavefield (230) to the spectral domain also comprises using a Fourier transform. As will occur to those of ordinary skill in the art, the spectral domain results are obtained after a Fourier transform of the frequency domain results with respect to space. In some embodiments, this Fourier transform is dependent upon the number of receivers (201) receiving the scattered acoustic wavefield (230). In an even further embodiment, the Fourier transform further comprises:

$$P^{sct}(js\alpha_n, js\beta_m, x_3^R | X^s, s) = \Delta x_1^R \Delta x_2^R \sum_{q=-1/2N+1}^{1/2N} \sum_{r=-1/2M+1}^{1/2M} \exp(js\alpha_n x_{1,q}^R + js\beta_m x_{2,r}^R) p^{sct}(x_{1,q}^R, x_{2,r}^R, x_3^R | X^s, s)$$

wherein:

$$s\alpha_n = n\frac{2\pi}{N\Delta x_1^R}, n = -1/2N + 1, \ldots, 1/2N$$

and wherein:

$$s\beta_m = m\frac{2\pi}{M\Delta x_2^R}, m = -1/2M + 1, \ldots, 1/2M$$

$P^{sct}$ comprises the spectral scattered acoustic wavefield.
$\Delta x_1^R$ comprises the in-line receiver sampling distance.
$\Delta x_2^R$ comprises the cross-line receiver sampling distance.
q comprises the in-line receiver number.
r comprises the cross-line receiver number.
$js\alpha_n$ comprises the in-line spectral Fourier parameter.
$js\beta_m$ comprises the cross-line spectral Fourier parameter.
$x_{1,q}^R$ comprises the in-line receiver coordinate.
$x_{2,r}^R$ comprises the cross-line receiver coordinate.
$p^{sct}$ comprises the scattered acoustic wavefield in the frequency domain.
$x_3^R$ comprises the receiver depth coordinate.
$X^S = (x_1^S, x_2^S, x_3^S)$ comprises the shot position.
s comprises the complex Laplace transform parameter.
n comprises the in-line spectral index.
N comprises the total number of in-line receivers.
m comprises the cross-line spectral index.
M comprises the total number of cross-line receivers.

Again, various other methods of transforming a scattered acoustic wavefield to the spectral domain such as, for example, Radon transforms will occur to those of ordinary skill in the art. Transforming to the spectral domain provides several benefits. Differentiation with respect to space becomes a simple multiplication in the spectral domain, and a space convolution becomes a simple product in the spectral domain—to name just a few.

In an even further embodiment of the present invention, deghosting (110) the scattered acoustic wavefield (230) in the spectral domain is also dependent upon the number of receivers (201) receiving the scattered acoustic wavefield (230). The advantage to deghost in the spectral domain is that it consists of a simple division. The deghosting (110) may be performed in both the in-line (225) and the cross-line (325) direction. In an even further embodiment, the deghosting (110) is dependent upon the vertical propagation coefficient. In one embodiment the vertical propagation coefficient comprises:

$$s\Gamma_{n,m}^{R} = j\sqrt{\left(\frac{2\pi f}{c}\right)^2 - (s\alpha_n)^2 - (s\beta_m)^2}$$

$s\Gamma_{n,m}^{R}$ comprises the vertical propagation coefficient.
j comprises the imaginary unit.

$$\left(\frac{2\pi f}{c}\right)^2$$

comprises the squared wavenumber.
c comprises the wavespeed in water.
$-(s\alpha_n)^2$ comprises the squared in-line spectral Fourier parameter.
$-(S\beta_m)^2$ comprises the squared cross-line spectral Fourier parameter.

As will also occur to those of ordinary skill, in alternate embodiments, predetermined values and functions of the vertical propagation coefficient are used.

In another embodiment, the deghosting (110) further comprises applying:

$$P^{dgh}(js\alpha_n, js\beta_m, 0 | X^s, s) = H(f)\frac{P^{sct}(js\alpha_n, js\beta_m, x_3^R | X^s, s)}{2\sinh(s\Gamma_{n,m}^{R}x_3^R)}$$

$P^{dgh}$ comprises the spectral deghosted acoustic wavefield at zero depth.
H comprises the causal frequency-band filter.
f comprises the frequency.
$P^{sct}$ comprises the spectral scattered acoustic wavefield.
$js\alpha_n$ comprises the in-line spectral Fourier parameter.
$js\beta_m$ comprises the cross-line spectral Fourier parameter.
$s\Gamma_{n,m}^{R}$ comprises the vertical propagation coefficient.
$x_3^R$ comprises the receiver depth coordinate.
$X^S=(x_1^S, x_2^S, x_3^S)$ comprises the shot position.

Of course in alternate embodiments, other deghosting equations such as, for example, finite difference methods in space, or any other equation that will occur to those of ordinary skill in the art are applied to the scattered acoustic wavefield (230).

In an even further embodiment, the transforming (115) the substantially deghosted transformed acoustic wavefield to the space-time domain further comprises an inverse Fourier transform with respect to the receiver coordinates, followed by an inverse Fourier transform with respect to the time. In the latter embodiment, the inverse Fourier transform with respect to time is dependent upon the number of receivers (201) receiving the scattered acoustic wavefield (230). In an even further embodiment, the Fourier transform comprises:

$$p^{dgh}(x_{1,q}, x_{2,r}^R, 0 | X^S, t)$$

$p^{dgh}$ comprises the deghosted acoustic wavefield at zero depth.
$x_{1,q}^R$ comprises the in-line receiver coordinate.
$x_{2,r}^R$ comprises the cross-line receiver coordinate.
$X^S=(x_1^S, x_2^S, x_3^S)$ comprises the shot position.
t comprises the time.

Of course, in various embodiments, any other equation or method of transforming (115) to the space-time domain is used. Such equations and methods are for example, the inverse Radon transform or any other equation or method that will occur to those of ordinary skill.

Figure 4:
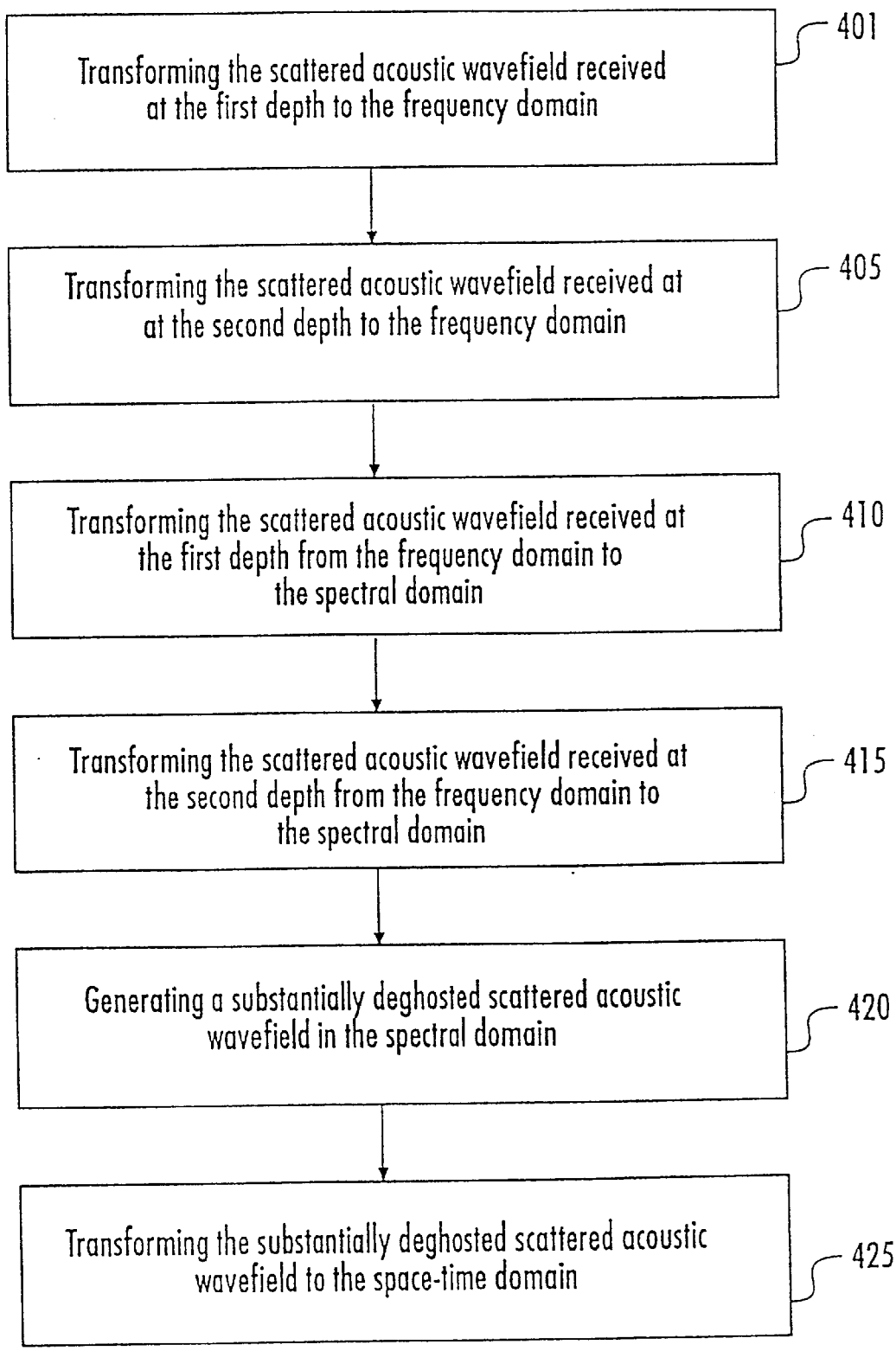
FIG. 4 is a block diagram of an example embodiment of a method of the present invention.
Figure 5:
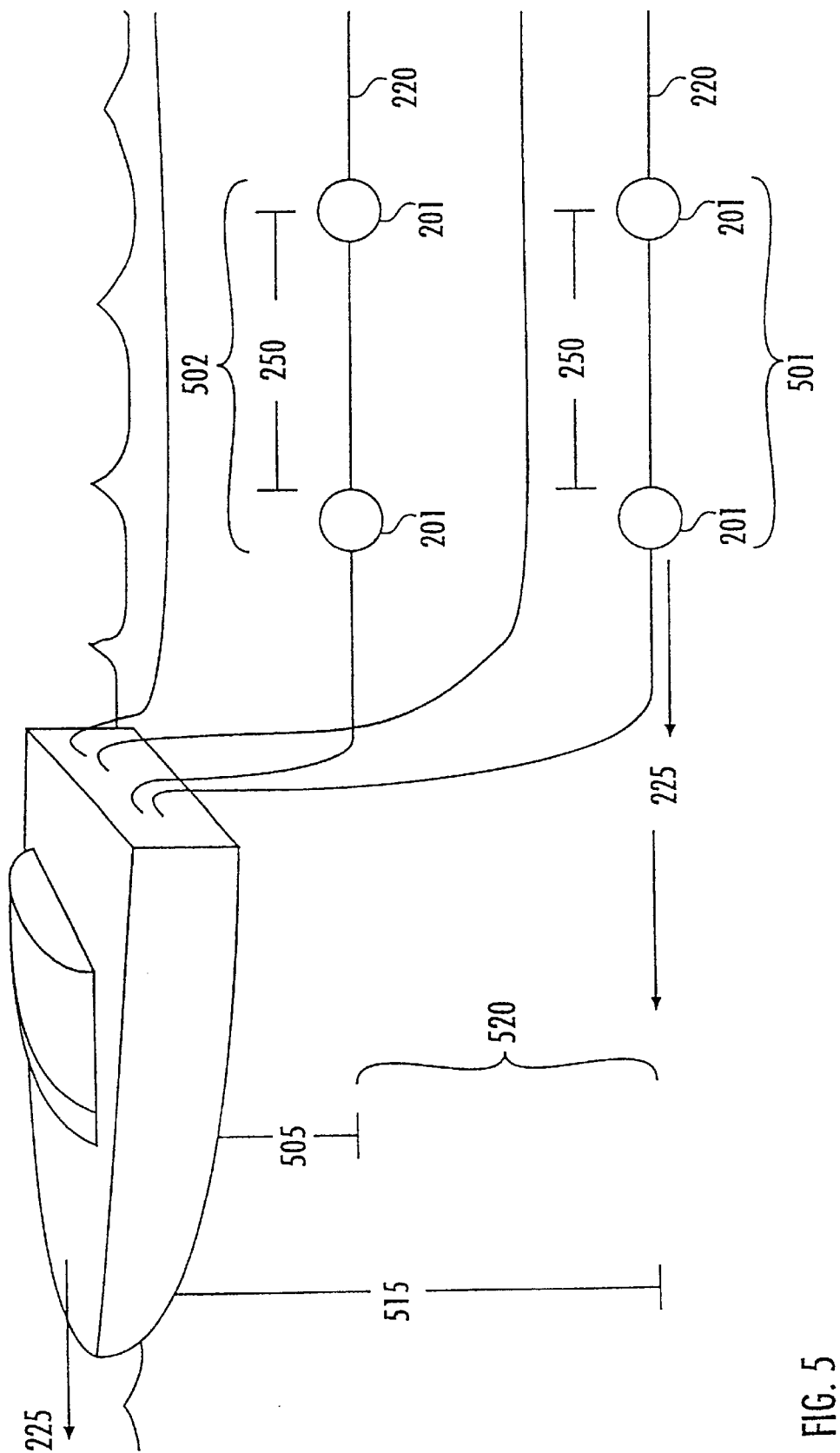
FIG. 5 is a diagram of various aspects of example embodiments of the present invention in the marine environment.
Figure 6:
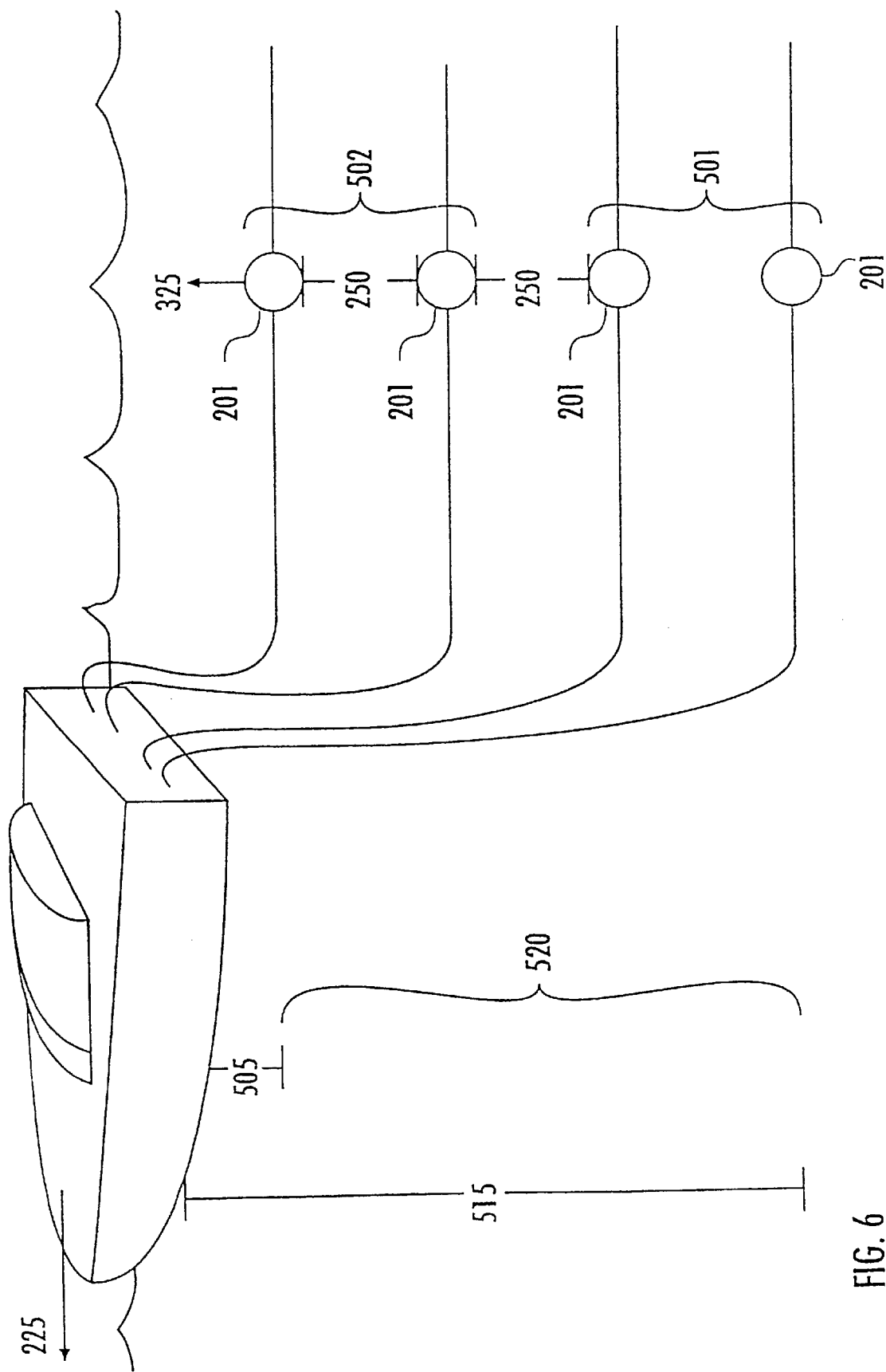
FIG. 6 is a diagram of various aspects of example embodiments of the present invention in the marine environment.

In an even further embodiment of the present invention, illustrated in FIGS. 4, 5, and 6, a method for processing a scattered acoustic wavefield (230) received by at least a first set (501) of two receivers (201) and a second set (502) of two receivers is provided. The first set (501) of two receivers (201) is offset (250) at substantially a first depth (515) which is vertically offset (520) from at least a second set (502) of two receivers (201) offset (250) at substantially a second depth (505). Turning to FIG. 4, the method comprises transforming (401) the scattered acoustic wavefield (230) received at the first depth (515) to the frequency domain. The method further comprises transforming (405) the scattered acoustic wavefield (230) received at the second depth (505) to the frequency domain (405). The method further comprises transforming (410) the scattered acoustic wavefield (230) received at the first depth (515) from the frequency domain to the spectral domain. The method further comprises transforming (415) the scattered acoustic wavefield (230) received at the second depth (505) from the frequency domain to the spectral domain. The method also comprises generating (420) a substantially deghosted scattered acoustic wavefield in the spectral domain. The method further comprises transforming (425) the substantially deghosted scattered acoustic wavefield to the space-time domain. In alternate embodiments, the streamer configuration is directly above one another or the streamers are triangularly positioned, as will be discussed below.

As shown in FIG. 5, in another embodiment, the at least a first set (501) of two receivers (201) are offset (250) in substantially the in-line direction (225) relative to one another and the at least a second set (502) of two receivers (201) are offset (250) in substantially the in-line direction (225) relative to one another.

In another embodiment, shown in FIG. 6, the at least a first set (501) of two receivers (201) are offset (250) in substantially the cross-line direction (325) relative to one another and the at least a second set (502) of two receivers (201) are offset (250) in substantially the cross-line direction (325) relative to one another.

In an even further embodiment, transforming (401) the scattered acoustic wavefield (230) received at the first depth (515) and the transforming (405) the scattered acoustic wavefield (230) and a second depth (505) to the frequency domain further comprises using a Fourier transform. In one embodiment this Fourier transform is dependent upon the number of receivers (201) receiving the scattered acoustic wavefield (230). In an even further embodiment, the Fourier transform further comprises:

$$p_1^{sct}(x_{1,q}^R, x_{2,r}^R, x_3^{R(1)} | X^S, s) \text{ at the first depth,}$$

and $p_2^{sct}(x_{1,q}^R, x_{2,r}^R, x_3^{R(2)}|X^S, s)$ at the second depth, wherein:

$s = j\omega = j2\pi f$ $p_1^{sct}$ comprises the scattered acoustic wavefield in the frequency domain at the first depth.

$p_2^{sct}$ comprises the scattered acoustic wavefield in the frequency domain at the second depth.

$x_{1,q}^R$ comprises the in-line receiver coordinate.

$x_{2,r}^R$ comprises the cross-line receiver coordinate.

$x_3^{R(1)}$ comprises the first receiver depth coordinate.

$x_3^{R(2)}$ comprises the second receiver depth coordinate.

$X^S = (x_1^S, x_2^S, x_3^S)$ comprises the shot position.

s comprises the complex Laplace transform parameter.

jω comprise the Fourier transform parameter.

j comprises the imaginary unit.

f comprises the real frequency.

In an even further embodiment, the transforming (410) the scattered acoustic wavefield (230) received at a first depth (515) to the spectral domain and the transforming (415) the scattered acoustic wavefield (230) received and a second depth (505) to the spectral domain comprises using a Fourier transform. In some embodiments, the Fourier transform is dependent upon the number of receivers (201) receiving the scattered acoustic wavefield (230). In another embodiment, the Fourier transform further comprises:

$$P_1^{sct}(js\alpha_n, js\beta_m, x_3^{R(1)}|X^s, s) = \Delta x_1^R \Delta x_2^R \sum_{q=-1/2N+1}^{1/2N}$$

$$\sum_{r=-1/2M+1}^{1/2M} \exp(js\alpha_n x_{1,q}^R + js\beta_m x_{2,r}^R) p_1^{sct}(x_{1,q}^R, x_{2,r}^R, x_3^{R(1)}|X^s, s)$$

at the first depth, and $$P_2^{sct}(js\alpha_n, js\beta_m, x_3^{R(2)}|X^s, s) = \Delta x_1^R \Delta x_2^R \sum_{q=-1/2N+1}^{1/2N}$$

$$\sum_{r=-1/2M+1}^{1/2M} \exp(js\alpha_n x_{1,q}^R + js\beta_m x_{2,r}^R) p_2^{sct}(x_{1,q}^R, x_{2,r}^R, x_3^{R(2)}|X^s, s)$$

at the second depth,
wherein:

$$s\alpha_n = n\frac{2\pi}{N\Delta x_1^R}, n = -1/2N+1, \ldots, 1/2N$$

and wherein:

$$s\beta_m = m\frac{2\pi}{M\Delta x_2^R}, m = -1/2M+1, \ldots, 1/2M$$

$P_1^{sct}$ comprises the spectral scattered acoustic wavefield at the first depth.

$P_2^{sct}$ comprises the spectral scattered acoustic wavefield at the second depth.

$\Delta x_1^R$ comprises the in-line receiver sampling distance.

$\Delta x_2^R$ comprises the cross-line receiver sampling distance.

q comprises the in-line receiver number.

r comprises the cross-line receiver number.

$js\alpha_n$ comprises the in-line spectral Fourier parameter.

$js\beta_m$ comprises the cross-line spectral Fourier parameter.

$x_{1,q}^R$ comprises the in-line receiver coordinate.

$x_{2,r}^R$ comprises the cross-line receiver coordinate.

$p_1^{sct}$ comprises the scattered acoustic wavefield in the frequency domain at the first depth.

$p_2^{sct}$ comprises the scattered acoustic wavefield in the frequency domain at the second depth.

$x_3^{R(1)}$ comprises the receiver coordinate at the first depth.

$x_3^{R(2)}$ comprises the receiver coordinate at the second depth.

$X^S = (x_1^S, x_2^S, x_3^S)$ comprises the shot position.

s comprises the complex Laplace transform parameter.

n comprises the in-line spectral index.

N comprises the total number of in-line receivers.

m comprises the cross-line spectral index.

M comprises the total number of cross-line receivers.

As above, transforming to the spectral domain is desired because differentiation with respect to space becomes a simple multiplication in the spectral domain, and a space convolution becomes a simple product in the spectral domain to name only a few benefits.

In an even further embodiment, the generating (420) a deghosted scattered acoustic wavefield in the spectral domain is dependent upon the number of receivers (201) receiving the scattered acoustic wavefield (230). In some embodiments, generating (420) a deghosted scattered acoustic wavefield is dependent upon the scattered acoustic wavefield (230) received at a first depth (515) and the scattered acoustic wavefield (230) received at second depth (505).

In an even further embodiment, generating (420) further comprises applying a filter. In one embodiment this filter comprises:

$P^{dgh} = P^{dgh}(js\alpha_n, js\beta_m, 0|X^S, s)$ wherein:

$$P^{dgh} = H(f) \frac{1}{2} \frac{[\sinh(s\Gamma_{n,m}^R x_3^{R(1)})]P_1^{sct} + [\sinh(s\Gamma_{n,m}^R x_3^{R(2)})]P_2^{sct}}{|\sinh(s\Gamma_{n,m}^R x_3^{R(1)})|^2 + |\sinh(s\Gamma_{n,m}^R x_3^{R(2)})|^2}$$

$P^{dgh}$ comprises the spectral deghosted acoustic wavefield at zero depth.

H comprises the causal frequency-band filter.

f comprises the frequency.

$P_1^{sct}$ comprises the spectral scattered acoustic wavefield at the first depth.

$P_2^{sct}$ comprises the spectral scattered acoustic wavefield at the second depth.

$js\alpha_n$ comprises the in-line spectral Fourier parameter.

$js\beta_m$ comprises the cross-line spectral Fourier parameter.

$s\Gamma_{n,m}^R$ comprises the vertical propagation coefficient.

$x_3^{R(1)}$ comprises the receiver coordinate at the first depth.

$x_3^{R(2)}$ comprises the receiver coordinate at the second depth.

$X^S = (x_1^S, x_2^S, x_3^S)$ comprises the shot position.

In another embodiment, the filter further comprises:

$P^{dgh} = P^{dgh}(js\alpha_n, js\beta_m, 0|X^S, s)$ wherein:

$$P^{dgh} = H(f)\frac{\exp(-s\Gamma_{n,m}^{R}x_3^{R(1)})P_2^{sct} - \exp(-s\Gamma_{n,m}^{R}x_3^{R(2)})P_1^{sct}}{2\sinh(s\Gamma_{n,m}^{R}d)}$$

wherein:

$$d = x_3^{R(2)} - x_3^{R(1)}$$

$P^{dgh}$ comprises the spectral deghosted acoustic wavefield at zero depth.

H comprises the causal frequency-band filter.

f comprises the frequency.

$P_1^{sct}$ comprises the spectral scattered acoustic wavefield at the first depth.

$P_2^{sct}$ comprises the spectral scattered acoustic wavefield at the second depth.

$js\alpha_n$ comprises the in-line spectral Fourier parameter.

$js\beta_m$ comprises the cross-line spectral Fourier parameter.

$s\Gamma_{n,m}^{R}$ comprises the vertical propagation coefficient.

$x_3^{R(1)}$ comprises the receiver coordinate at the first depth.

$x_3^{R(2)}$ comprises the receiver coordinate at the second depth.

$X^S = (x_1^S, x_2^S, x_3^S)$ comprises the shot position.

d comprises the vertical distance between the first and the second depth of the receivers.

In still a further embodiment, the filter further comprises:

$$P^{dgh} = P^{dgh}\left(js\alpha_n, js\beta_m, \frac{x_3^{R(1)} + x_3^{R(2)}}{2} \middle| X^s, s\right)$$

wherein:

$$P^{dgh} = H(f)\frac{\exp(s\Gamma_{n,m}^{R}d/2)P_2^{sct} - \exp(-s\Gamma_{n,m}^{R}d/2)P_1^{sct}}{2\sinh(s\Gamma_{n,m}^{R}d)}$$

$P^{dgh}$ comprises the spectral deghosted acoustic wavefield at the depth level exactly between the first and the second receiver depths.

H comprises the causal frequency-band filter.

f comprises the frequency.

$P_1^{sct}$ comprises the spectral scattered acoustic wavefield at the first depth.

$P_2^{sct}$ comprises the spectral scattered acoustic wavefield at the second depth.

$js\alpha_n$ comprises the in-line spectral Fourier parameter.

$js\beta_m$ comprises the cross-line spectral Fourier parameter.

$s\Gamma_{n,m}^{R}$ comprises the vertical propagation coefficient.

$x_3^{R(1)}$ comprises the receiver coordinate at the first depth.

$x_3^{R(2)}$ comprises the receiver coordinate at the second depth.

$X^S = (x_1^S, x_2^S, x_3^S)$ comprises the shot position.

d comprises the vertical distance between the first and the second depth of the receivers.

As above, deghosting in the spectral domain has various benefits, for example, the deghosting is actualized by simple multiplication and division.

In an even further embodiment, transforming (425) the substantially deghosted scattered acoustic wavefield to the space-time domain further comprises an inverse Fourier transform with respect to the receiver coordinates, followed by an inverse Fourier transform with respect to the time. In the latter embodiment, the inverse Fourier transform with respect to time is dependent upon the number of receivers (201) receiving the scattered acoustic wavefield (230). In an even further embodiment, the Fourier transform further comprises:

$$p^{dgh}(x_{1,q}^{R}, x_{2,r}^{R}, x_3^{dgh} | X^S, t)$$

$p^{dgh}$ comprises the deghosted acoustic wavefield at the depth $x_3^{dgh}$.

$x_{1,q}^{R}$ comprises the in-line receiver coordinate.

$x_{2,r}^{R}$ comprises the cross-line receiver coordinate.

$x_3^{dgh}$ comprises the appropriate deghosting depth level.

$X^S = (x_1^S, x_2^S, x_3^S)$ comprises the shot position.

t comprises the time.

Figure 7:
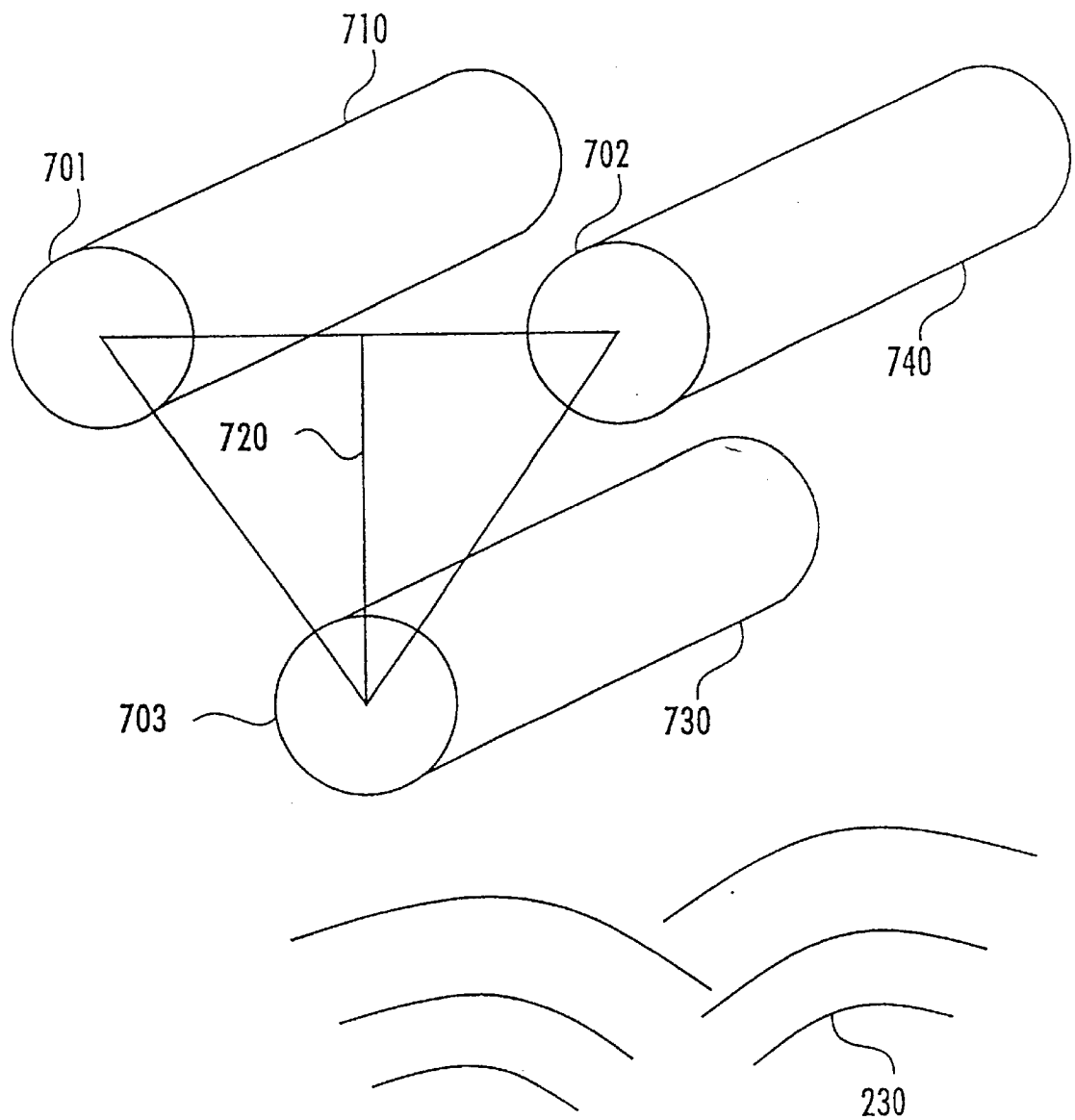
FIG. 7 is a diagram of various aspects of example embodiments of a method, system, and apparatus of the present invention.

Turning now to FIG. 7, a method for receiving an acoustic wavefield beneath the surface of the water is also provided. In one embodiment, the method comprises receiving at least a portion of an acoustic wavefield (230) at a first position (701). The method also comprises receiving at least a portion of an acoustic wavefield at a second position (702) and receiving at least a portion of an acoustic wavefield at a third position (703). As shown in FIG. 7, the first position (701), the second position (702), and the third position (703) are triangularly positioned (720) relative to one another. One of ordinary skill in the art will recognize that in FIG. 7, the positions of reception (701)(702)(703) appear to be at the corners of a triangle (720). Furthermore, the first position (701) is not directly above or below the second position (702). The first position (701) is also not directly above or below the third position (703). The second position (702) is not directly above or below the third position (703). As will occur to those of ordinary skill in the art, receiving is accomplished through the use of hydrophones, geophones, accelerometers, or any other receiver that will occur to those of ordinary skill in the art.

In some embodiments, triangularly positioned (720) further comprises locating the first position (701), the second position (702) and the third position (703) on the corners of a triangle when viewed from the in-line direction (225). As will occur to those of ordinary skill in the art, this method for receiving an acoustic wavefield (230) contradicts conventional methods which desire the streamers to be directly above one another. However, receivers (201) are mounted on streamers at these locations (701) (702) (703) on at least three seismic streamers (710) (740) (730). In alternate embodiments, the triangle (720) is an isosceles triangle, and an equilateral triangle, an obtuse triangle, or any other triangle that will occur to one of ordinary skill in the art.

Figure 9:
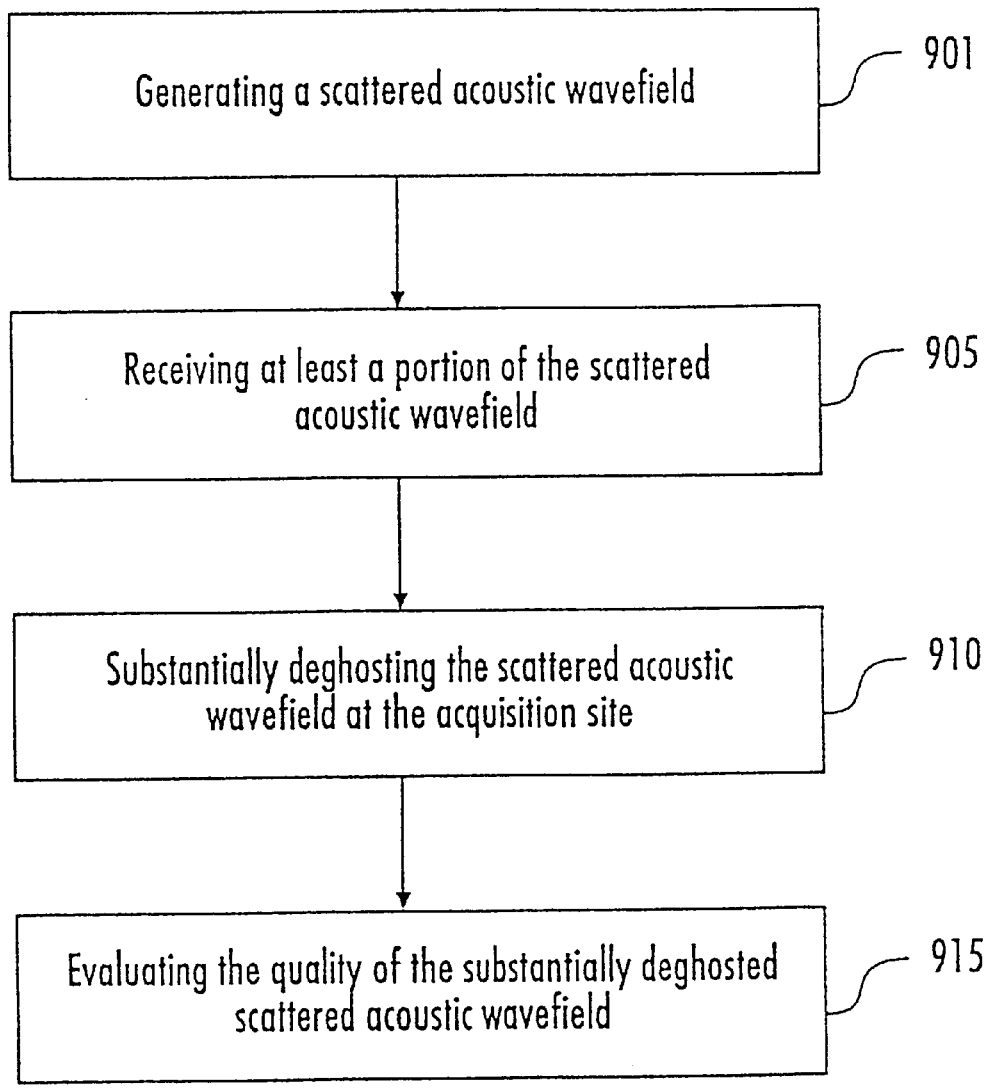
FIG. 9 is a block diagram of an example embodiment of a method of the present invention.
Figure 10:
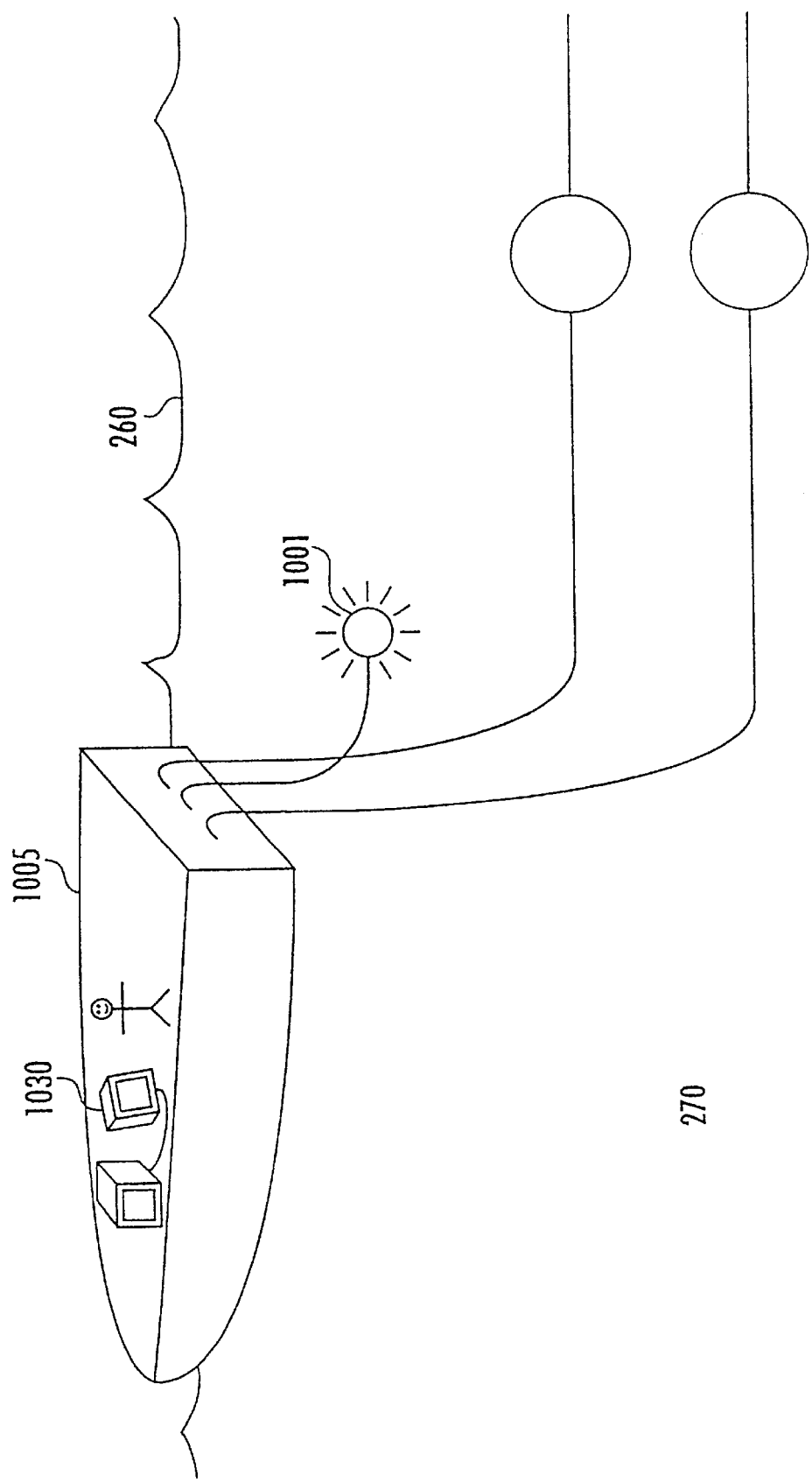
FIG. 10 is a diagram of various aspects of example embodiments of a method, system, and apparatus of the present invention in the marine environment.

In another embodiment of the present invention, illustrated in FIGS. 9 and 10, a method of controlling the quality of seismic data acquisition substantially near the acquisition site is provided. The method comprises generating (901) a scattered acoustic wavefield (230). A scattered acoustic wavefield (230) may be generated (901) by using for example, a seismic source (1001) such as dynamite, an airgun, a marine vibrator, or any other method of generating a scattered acoustic wavefield (230) that will occur to those of ordinary skill in the art.

The method further comprises receiving (905) at least a portion of the scattered acoustic wavefield (230). Seismic sensors such as hydrophones, geophones, accelerometers, and the like may be used to receive at least a portion of a scattered acoustic wavefield at a given location—where the sensor is located. Of course any other method of receiving (905) at least a portion of a scattered acoustic wavefield (230) such as pressure and/or velocity sensitive devices may also be used. Furthermore, in further embodiments, receiving (905) includes a computer which is designed to accept an acoustic wavefield (230).

The method further comprises substantially deghosting (910) the scattered acoustic wavefield (230) relatively near the acquisition site. Often this substantial deghosting (910) will be during the acquisition phase itself. For example, the deghosting (910) may be performed on the seismic vessel (210) in marine acquisition situations and near the acquisition site in land acquisition situations. Various methods of deghosting are taught herein and other methods of deghosting such as space-time difference methods and space-frequency methods will occur to those of ordinary skill in the art. In alternate embodiments, the deghosting (910) is performed in either the in-line (225) direction or the cross-line (325) direction. In various embodiments, the deghosting (910) is performed in the time domain, the frequency domain, the spectral domain, the wave number domain, or any other domain which will occur to those of ordinary skill in the art.

The method further comprises evaluating (915) the quality of the substantially deghosted scattered acoustic wavefield. In one embodiment, the quality is compared with predetermined standards that will occur to those of ordinary skill. In alternate embodiments, the quality is subjectively evaluated by a person (1005) at the acquisition site. Of course, in an even further embodiment, the quality is evaluated (915) by computer assistance, or by any other method that will occur to those of ordinary skill in the art. By evaluating (915) the quality of the seismic data, a decision can be made as to whether the data is suitable for processing. If the data is not suitable for processing, new data may be acquired before leaving the area. As will occur to those skilled in the art, what is suitable will vary upon further processing to be performed and various conditions surrounding the geographic and economics of the seismic data acquisition.

In an even further embodiment, the acquisition site is on land. In another marine embodiment, the method further comprises generating (901) a scattered acoustic wavefield (230) in the water. In another marine embodiment, the method comprises receiving (905) at least a portion of the scattered acoustic wavefield (230) below the surface (260) of the water (270). In a further embodiment, the method comprises substantially deghosting (910) the scattered acoustic wavefield (230) on board a seismic boat (210). By deghosting on board the boat (210) or vessel (210), the quality of the data (1030) can be evaluated before the boat (210) or vessel (210) leaves the acquisition site.

Figure 11:
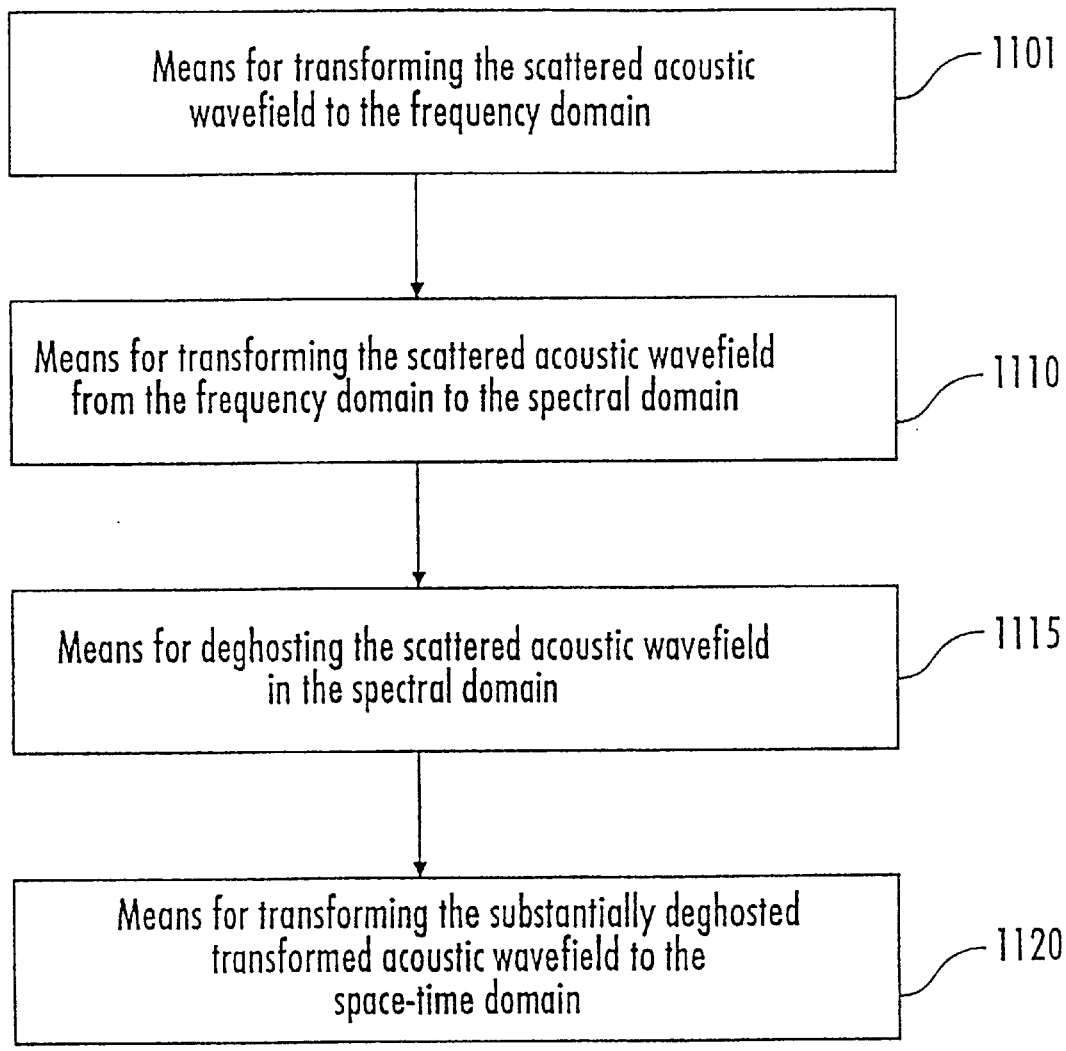
FIG. 11 is a block diagram of an example embodiment of a system of the present invention.

In a further embodiment, a system for processing a scattered acoustic wavefield (230) received by at least two receivers (201) offset (250) and located at approximately the same depth (205) is provided. Turning now to FIG. 11, in one embodiment, the system comprises means for transforming (1101) the scattered acoustic wavefield (230) to the frequency domain. In various embodiments, means for transforming (1101) may be a digital computer or analog machine capable of implementing a domain changing formula, a Fourier transformer, a calculator, an analog machine, or a pen, pencil or other utensil used by one of ordinary skill in the art to change the domain of the scattered acoustic wavefield (230). Of course, in alternate embodiments, means for transforming (1101) comprises Fast Fourier Transformsers (FFT), Discrete Fourier Transformers (DFT), and means for performing discrete versions of the Laplace Transforms or any other means that would occur to those of ordinary skill in the art.

The system further comprises means for transforming (1110) the scattered acoustic wavefield (230) from the frequency domain to the spectral domain. In various embodiments, means for transforming (1110) is a digital computer or analog machine capable of implementing a domain changing formula, or a Fourier transformer, a calculator, an analog machine or a pen, pencil or other utensil used by one of ordinary skill in the art to change the domain of the scattered acoustic wavefield (230).

The system further comprises means for deghosting (1115) the scattered acoustic wavefield (230) in the spectral domain. In various embodiments, means for deghosting (1115) is a digital computer, analog machine, or utensil which can apply a deghosting algorithm, equation, filter or process. Of course in further embodiments, means for deghosting is any other means that will occur to those of ordinary skill in the art. Of course, in alternate embodiments the means for deghosting is provided for deghosting the scattered acoustic wavefield in the frequency, time, wave number or any other domain which will occur to those of ordinary skill in the art.

The system further comprises means for transforming (1120) the substantially deghosted transformed acoustic wavefield (230) to the space-time domain. Of course in various embodiments, means for transforming (1120) is a digital computer or analog machine capable of applying a domain changing formula, algorithm, or process, or any other means that will occur to those of ordinary skill in the art.

In a further embodiment, a system for processing a scattered acoustic wavefield (230) received by at least a first set (501) of two receivers (201) and a second set (502) of two receivers (201) is provided. The first set (501) of two receivers (201) are offset (250) at substantially a first depth (515) which is vertically offset (520) from at least the second set (502) of two receivers (201) offset (250) at substantially a second depth (505).

Figure 12:
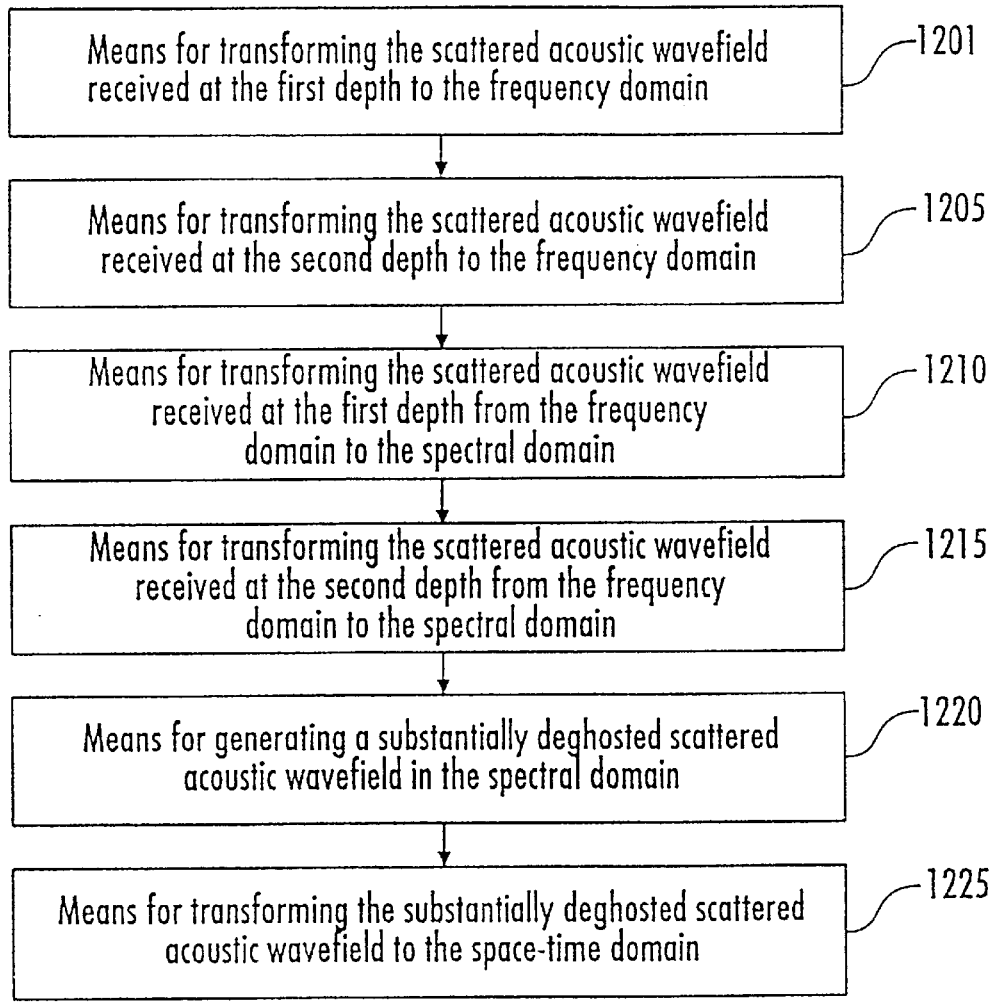
FIG. 12 is a block diagram of an example embodiment of a system of the present invention.

Referring to FIG. 12, the system comprises a means for transforming (1201) the scattered acoustic wavefield (230) received at the first depth (515) to the frequency domain and a means for transforming (1205) the scattered acoustic wavefield (230) received at the second depth (505) to the frequency domain. In various embodiments, this means for transforming (1201)(1205) further comprises a digital computer or analog machine capable of transforming a domain, or implementing a Fourier transform, or any other means that will occur to those of ordinary skill in the art. As will occur to those of ordinary skill in the art, the means for transforming (1205) at the first depth (515) and the second depth (505) may be the same in some embodiments and different in others.

The system further comprises means for transforming (1210) the scattered acoustic wavefield (230) received at the first depth (515) from the frequency domain to the spectral domain and a means for transforming (1215) the scattered acoustic wavefield (230) received at the second depth (505) to the spectral domain. In various embodiments, this means for transforming (1210) further comprises a digital computer or analog machine capable of transforming a domain, or implementing a Fourier transform, or any other means that will occur to those of ordinary skill in the art. As will occur to those of ordinary skill in the art, the means for transforming (1210)(1215) at the first depth (515) and the second depth (505) may be the same in some embodiments and different in others.

The system further comprises means for generating (1220) a substantially deghosted scattered acoustic wavefield in the spectral domain. In various embodiments, this means for generating (1220) a substantially deghosted scattered acoustic wavefield further comprises a digital computer or analog machine capable of performing a deghosting algorithm, process or method, a filter, or any other means that will occur to those of ordinary skill in the art. Of course, in alternate embodiments the means for generating a substantially deghosted scattered acoustic wavefield is a means for generating in the frequency, time, wave number or any other domain which will occur to those of ordinary skill in the art.

The system further comprises means for transforming (1225) the substantially deghosted scattered acoustic wavefield to the space-time domain. In various embodiments, this means for transforming (1225) further comprises a digital computer or analog machine capable of applying a domain changing formula, a Fourier transformer, or any other means that will occur to those of ordinary skill in the art.

Figure 13:
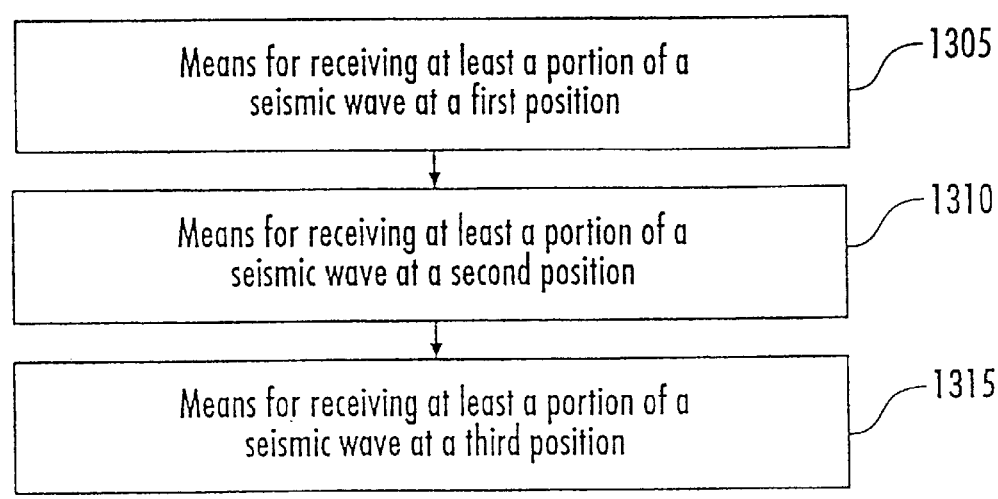
FIG. 13 is a block diagram of an example embodiment of a system of the present invention.

In another embodiment of the present invention, a system for receiving acoustic wavefield beneath the surface of the water is provided. Referring to FIG. 13 and FIG. 7, the system comprises means for receiving (1305)(1310)(1315) at least a portion of an acoustic wavefield at a first position (701), a second position (702), and a third position (713). In various embodiments, means for receiving seismic receivers (201) are positioned to receive the acoustic wavefield at a given location (701)(702)(713) on seismic streamers (710) (740)(730). Various receivers are geophones, hydrophones, accelerometers, pressure and/or velocity sensitive devices or any other means that will occur to those of ordinary skill in the art.

In an even further embodiment, the first position (701), the second position (702), and the third position (713) are triangularly positioned relative to one another. In another embodiment, triangularly positioned further comprises means for locating the means for receiving (1305) at the first position (701), the means for locating the means for receiving (1310) at the second position (702), and the means for locating the means for receiving (1315) at the third position (713) on the corners of a triangle when viewed from the in-line direction (225). In various embodiments, the triangle (720) is an isosceles triangle, an equilateral triangle, or any other triangle that will occur to those of ordinary skill in the art. In various embodiments, the means for locating are streamers with receivers secured to them at the first (701) second (702) and third (703) locations. In even further embodiments, means for locating (1305), (1310), (1315) are structural means capable of securing streamers or receivers in relative position to one another.

Figure 14:
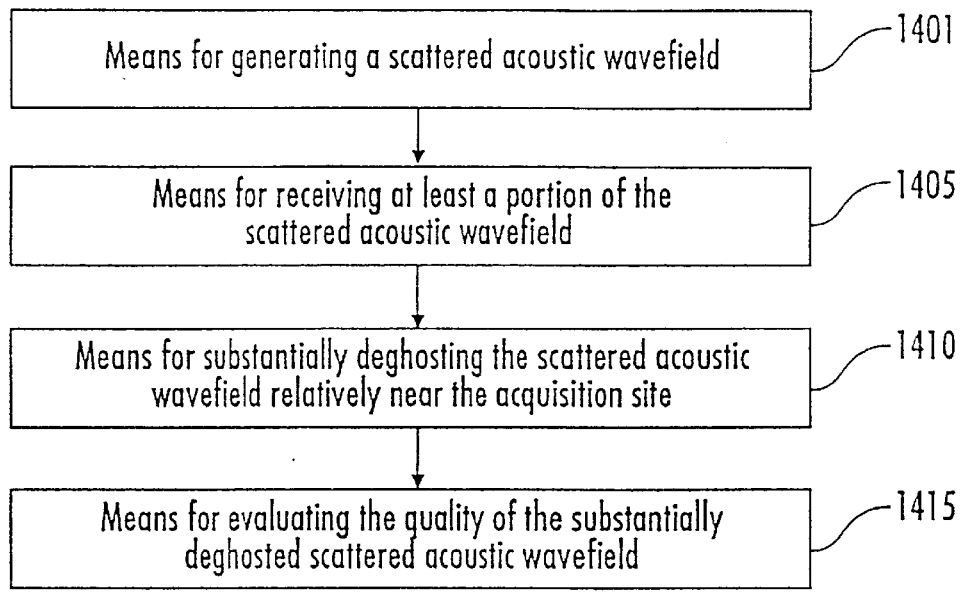
FIG. 14 is a block diagram of an example embodiment of a system of the present invention.
Figure 15:
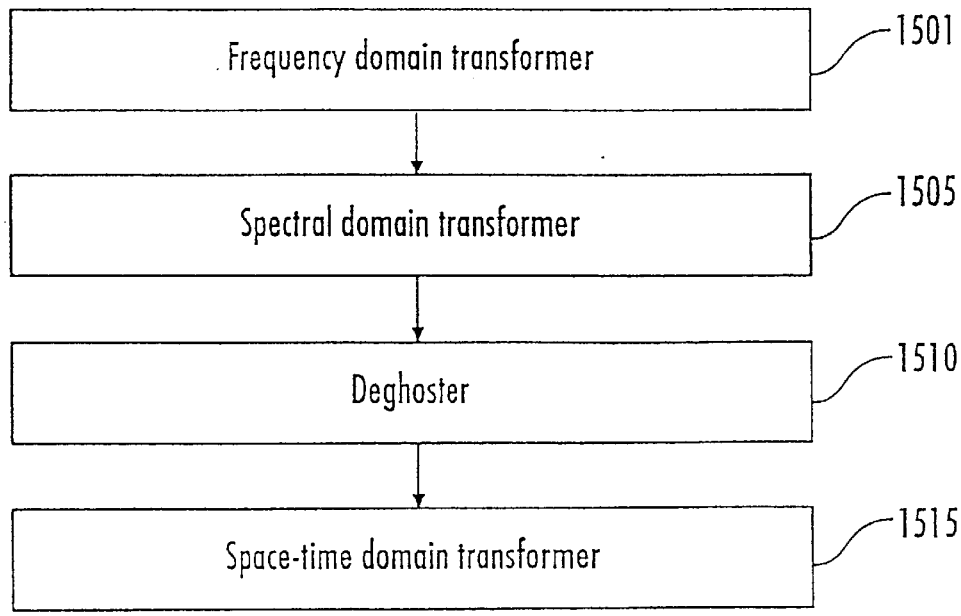
FIG. 15 is a block diagram of an example embodiment of an apparatus of the present invention.

A system of controlling the quality of seismic data acquisition substantially near the acquisition site is provided. The system is illustrated in block diagram form in FIG. 14. The system comprises a means for generating (1401) a scattered acoustic wavefield (230). In alternate embodiments, this means for generating (1401) a scattered acoustic wavefield (230) is an air gun, dynamite, a marine vibrator, or any other means that will occur to those of ordinary skill in the art. In various embodiments, these means are employed below or above the surface of water, on land or any other location that will occur to those of ordinary skill in the art.

The system further comprises means for receiving (1405) at least a portion of the scattered acoustic wavefield (230). In various embodiments, means for receiving (1405) a portion of a scattered acoustic wavefield (230) are seismic receivers such as hydrophones, geophones, accelerometers, pressure and/or velocity sensitive devices or any other means that will occur to those of ordinary skill in the art. In various embodiments, these receivers are employed below or above the surface of water, on land or any other location that will occur to those of ordinary skill in the art. In even further various embodiments, receivers are located at various depths, the same depth, on a single streamer, or on multiple streamers. In even further embodiments, means for receiving (1405) is a digital computer or analog machine which can accept a scattered acoustic wavefield for processing. In various embodiments, such computers and analog machines or any other means that will occur to those of ordinary skill in the art.

The system further comprises a means for substantially deghosting (1410) the scattered acoustic wavefield (230) relatively near the acquisition site. In some embodiments, such means (1410) is a digital computer or analog machine capable of applying a deghosting equation algorithm or process, or any other means that will occur to those of ordinary skill in the art.

The system further comprises a means for evaluating (1415) the quality of the substantially deghosted scattered acoustic wavefield. In various embodiments, means for evaluating (1415) is a digital computer or analog machine capable of comparing various attributes of the data acquired with predetermined standards. In even further embodiments, the means for evaluating (1415) is a digital computer, or analog machine, or any other means that will occur to those of ordinary skill in the art.

In an even further embodiment, an apparatus for processing a scattered acoustic wavefield (230) received by at least two receivers (201) which are offset (250) and located at approximately the same depth (205) is provided. The apparatus comprises a frequency domain transformer (1501). In various embodiments, the frequency domain transformer (1501) comprises a digital computer or analog machine capable of changing the domain of a scattered acoustic wavefield (230), a digital computer or analog machine capable of applying a Fourier transformer, or any other domain transformer that will occur to those of ordinary skill in the art.

The apparatus further comprises a spectral domain transformer (1505). In various embodiments, the spectral domain transformer (1505) comprises a digital computer or analog machine capable of changing the domain of a scattered acoustic wavefield (230), a digital computer or analog machine capable of applying a Fourier transformer or any other domain transformer that will occur to those of ordinary skill in the art.

The apparatus further comprises a deghoster (1510). In various embodiments, the deghoster (1510) is a digital computer or analog machine capable of applying a deghosting equation, filter, algorithm, or method, or any other deghoster that will occur to those of ordinary skill in the art.

The apparatus further comprises a space-time domain transformer (1515). In various embodiments, the space-time domain transformer (1515) comprises a digital computer or analog machine capable of changing the domain of a scattered acoustic wavefield (230). In even further embodiments, the space-time domain transformer (1515) further comprises a digital computer or analog machine capable of applying a Fourier transform, or any other domain changing equation, algorithm, filter, method, or any other domain transformer that will occur to those of ordinary skill in the art.

Figure 16:
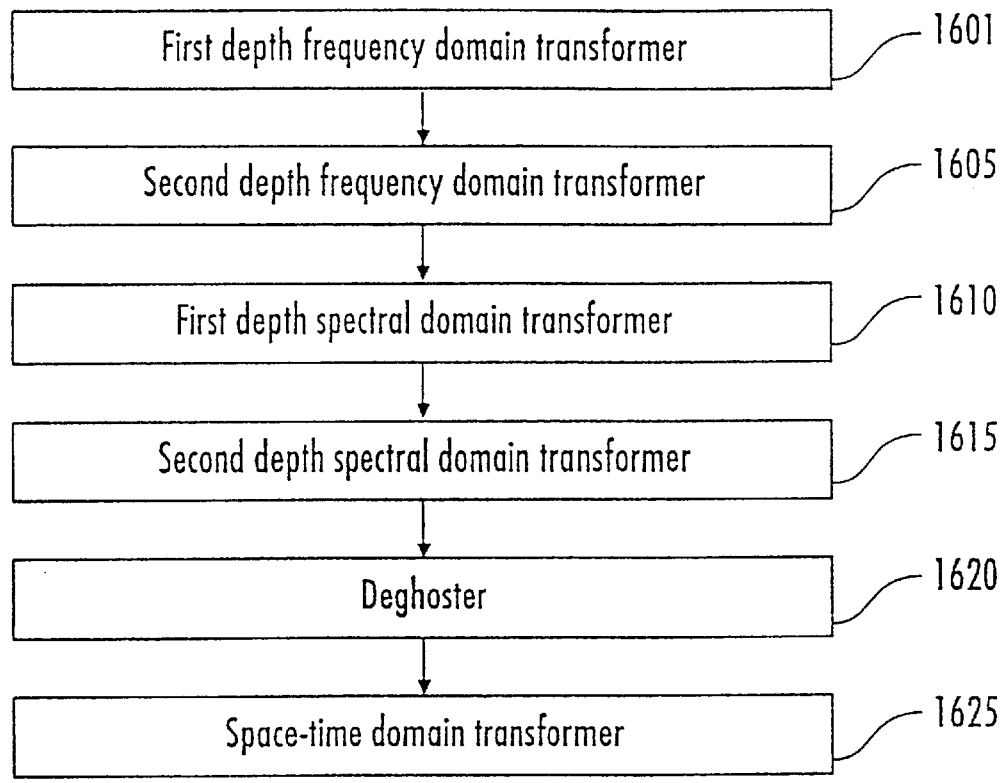
FIG. 16 is a block diagram of an example embodiment of an apparatus of the present invention.
Figure 17:
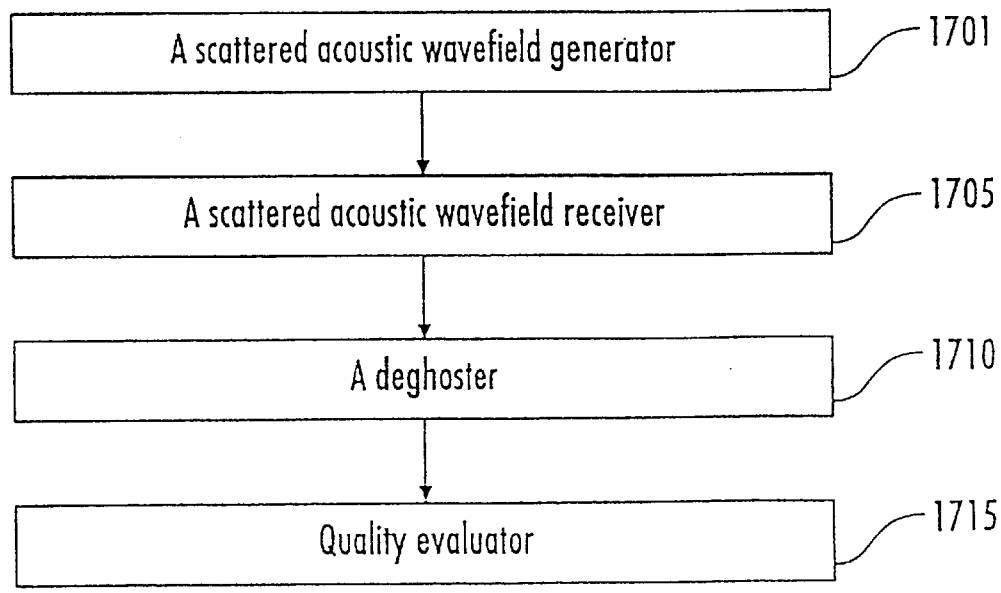
FIG. 17 is a block diagram of an example embodiment of an apparatus of the present invention.

In an even further embodiment, the apparatus is capable of being used on board a seismic vessel (210). In an even further embodiment, an apparatus for processing a scattered acoustic wavefield (230) received by at least a first set (501) of two receivers and a second set (502) of two receivers (201). The first set of two (501) receivers (201) is offset (250) at substantially a first depth (515) which is vertically offset (520) from at least a second set (502) of two receivers (201) offset (250) at substantially a second depth (505) is provided. As illustrated in block diagram form, in FIG. 16, the apparatus comprises a first depth frequency domain transformer (1601). In various embodiments, the first depth (515) frequency domain transformer (1601) comprises a digital computer or analog machine capable of changing the domain, a digital or analog machine capable of applying a Fourier transform, or any other transformer that will occur to those of ordinary skill in the art.

The apparatus further comprises a second depth (505) frequency domain transformer (1605). In various embodiments, the second depth (505) frequency domain transformer (1605) comprises a digital computer or analog machine capable of changing the domain, a digital or analog machine capable of applying a Fourier transform or any other transformer that will occur to those of ordinary skill in the art.

The apparatus further comprises a first depth (515) spectral domain transformer (1610). In various embodiments, the first depth (515) spectral domain transformer (1610) comprises a digital computer or analog machine capable of changing the domain, a digital or analog machine capable of applying a Fourier transform or any other transformer that will occur to those of ordinary skill in the art.

The apparatus further comprises a second depth (505) spectral domain transformer (1615). In various embodiments, the second depth (505) spectral domain transformer (1615) comprises a digital computer or analog machine capable of changing the domain, a digital or analog machine capable of applying a Fourier transform or any other transformer that will occur to those of ordinary skill in the art.

The apparatus further comprises a deghoster (1620). In various embodiments, the deghoster (1620) comprises a digital computer or analog machine capable of applying a deghosting equation, filter, or method, or any other deghoster that will occur to those of ordinary skill in the art.

The apparatus further comprises a space-time domain transformer (1625). In various embodiments, the space-time domain transformer (1625) comprises a digital computer or analog machine capable of changing the domain, a digital or analog machine capable of applying a Fourier transform or any other transformer that will occur to those of ordinary skill in the art.

Figure 8:
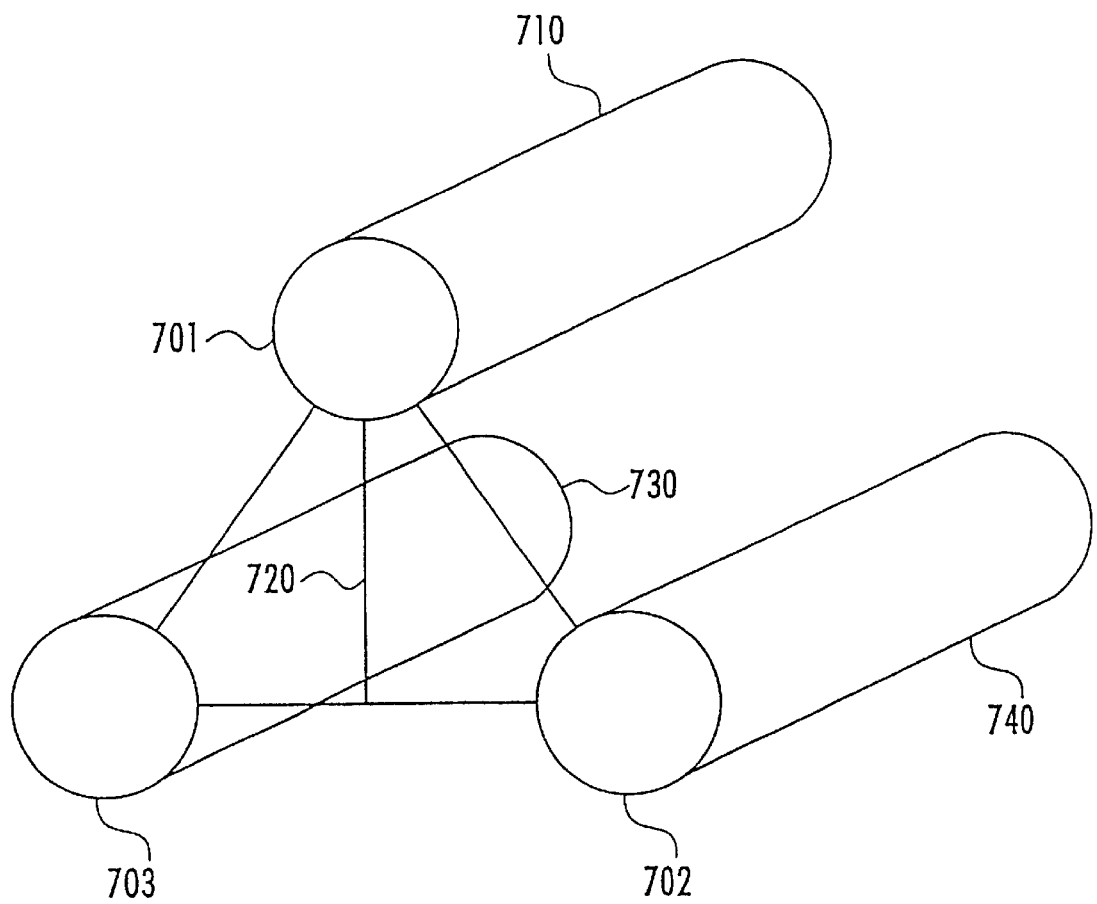
FIG. 8 is a diagram of various aspects of example embodiments of a method, system, and apparatus of the present invention.

In an even further embodiment of the present invention, a streamer configuration is provided. As illustrated in FIGS. 7 and 8, the streamer configuration comprises a first seismic streamer (710), a second seismic streamer (740) and a third seismic streamer (730). Seismic streamers are available and widely known to those of ordinary skill in the art.

In the present configuration, the first seismic streamer (710), the second seismic streamer (740), and the third seismic streamer (730) are essentially triangularly positioned relative to one another. In one embodiment, triangularly positioned further comprises having the first seismic streamer (710), the second seismic streamer (740), and the third seismic streamer (730) positioned at a corner of a triangle when viewed from the in-line direction (225). Furthermore, the first streamer (710) is not directly above or below the second (740) or third (730) streamer. Even further, the second streamer (740) is not above or below the third streamer (730). The seismic streamers (710) (740) (730) support seismic receivers (701) (702) (703) which receive at least a portion of an acoustic wavefield in this configuration.

In a further embodiment, triangularly positioned further comprises positioned at the corner of an equilateral triangle, at corner of an isosceles triangle, or any other triangle that will occur to those of ordinary skill in the art.

In an even further embodiment, an apparatus for controlling the quality of seismic data acquisition at the acquisition site is provided. The apparatus is illustrated in block diagram form in FIG. 18. The apparatus comprises a scattered acoustic wavefield (230) generator (1701). In various embodiments, this scattered acoustic wavefield (230) generator (1701) is a seismic source such as an airgun, dynamite, marine vibrator, or any other scattered acoustic wavefield generator.

The apparatus further comprises a scattered acoustic wavefield (230) receiver (1705). In various embodiments, the scattered acoustic wavefield (230) receiver (1705) is a digital computer which receives either a portion or the full scattered acoustic wavefield (230), or any other wavefield receiver that will occur to those of ordinary skill in the art. In alternate embodiments, the scattered acoustic wavefield receiver (1705) is a hydrophone, geophone, accelerometer, pressure transducer, velocity transducer, or any other receiver that will occur to those of ordinary skill in the art.

The apparatus further comprises a deghoster (1710). In various embodiments, the deghoster (1710) comprises a digital computer or analog machine capable of deghosting, or any other deghoster that will occur to those of ordinary skill in the art.

The apparatus further comprises a quality evaluator (1715). In various embodiments, a quality evaluator (1715) is a digital computer or analog machine capable of evaluating or comparing seismic data, or any other quality evaluator that will occur to those of ordinary skill in the art.

In a further embodiment, the apparatus is designed to be located and used near a land acquisition site. In alternate embodiments, the apparatus is relatively near the shot location or the receiver location. In an even further embodiment, the acquisition site is a marine acquisition site. In marine embodiments, the apparatus may be primarily located onboard a seismic vessel (210). In doing so, the apparatus will evaluate (1715) the quality of the seismic data while the vessel (210) still has the opportunity to acquire more suitable marine data from the same area.

As will occur to those of ordinary skill in the art, the above described embodiments are examples of embodiments of the present invention. These example embodiments are merely illustrative, and in no way exhaustive of the scope of the present invention.

We claim:

1. A method for receiving acoustic wavefield beneath the surface of the water, the method comprising:

receiving at least a portion of an acoustic wavefield at a first position;

receiving at least a portion of an acoustic wavefield at a second position;

receiving at least a portion of an acoustic wavefield at a third position, wherein the first position, the second position, and the third position are triangularly positioned relative to one another and wherein the first position is not directly above or below the second position and wherein the first position is not directly above or below the third position and wherein the second position is not directly above or below the third position;

transforming the received portions of the acoustic wavefield from the first, the second and the third positions from the space-time domain to the spatial frequency domain;

deghosting the transformed acoustic wavefield; and transforming the deghosted wavefield back to the space time domain.

2. The method of claim 1, wherein triangularly positioned further comprises locating the first position, the second position and the third position at the corners of a triangle when viewed from the in-line direction.

3. The method of claim 2, wherein the triangle is an isosceles triangle.

4. The method of claim 2 wherein the triangle is an equilateral triangle.

5. A system for receiving acoustic wavefield beneath the surface of the water, the system comprising:

means for receiving at least a portion of an acoustic wavefield at a first position;

means for receiving at least a portion of an acoustic wavefield at a second position;

means for receiving at least a portion of an acoustic wavefield at a third position, wherein the first position, the second position, and the third position are triangularly positioned relative to one another and wherein the first position is not directly above or below the second position and wherein the first position is not directly above or below the third position and wherein the second position is not directly above or below the third position;

means for transforming the received portions of the acoustic wavefield from the first, the second and the third positions from the space-time domain to the spatial frequency domain;

means for deghosting the transformed acoustic wavefield; and means for transforming the deghosted wavefield back to the space time domain.

6. The system of claim 5, wherein triangularly positioned further comprises locating the first position, the second position and the third position at the corners of a triangle when viewed from the in-line direction.

7. The system of claim 5, wherein the triangle is an isosceles triangle.

8. The system of claim 5 wherein the triangle is an equilateral triangle.

* * * * *